US011159461B2

(12) United States Patent
Faulkner et al.

(10) Patent No.: US 11,159,461 B2
(45) Date of Patent: Oct. 26, 2021

(54) CATCH-UP POLL: MISSED POLL

(71) Applicant: Microsoft Technology Licensing, LLC, Redmond, WA (US)

(72) Inventors: Jason Thomas Faulkner, Seattle, WA (US); Rajiv Ramaiah, Bellevue, WA (US); Tiphanie Lau, Seattle, WA (US); Sonu Arora, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 3 days.

(21) Appl. No.: 16/654,215

(22) Filed: Oct. 16, 2019

(65) Prior Publication Data

US 2021/0119946 A1 Apr. 22, 2021

(51) Int. Cl.
*H04L 12/58* (2006.01)

(52) U.S. Cl.
CPC .......... *H04L 51/043* (2013.01); *H04L 51/046* (2013.01); *H04L 51/16* (2013.01); *H04L 51/18* (2013.01)

(58) Field of Classification Search
CPC ..... H04L 51/043; H04L 51/046; H04L 51/16; H04L 51/18; H04L 67/306; G06Q 30/0203; G06Q 30/0641; G06Q 50/01; H04W 4/029; G06N 20/00
See application file for complete search history.

(56) References Cited

U.S. PATENT DOCUMENTS

| | | |
|---|---|---|
| 7,817,584 B2 | 10/2010 | Campbell et al. |
| 8,260,852 B1 | 9/2012 | Cselle |
| 10,235,025 B2 * | 3/2019 | Falaki ................ G06F 13/00 |
| 2003/0100321 A1 | 5/2003 | Rao et al. |
| 2003/0200137 A1 | 10/2003 | Drummond |
| 2007/0265903 A1 | 11/2007 | Blair et al. |
| 2008/0059308 A1 | 3/2008 | Gerken |
| 2009/0152349 A1 | 6/2009 | Bonev et al. |
| 2014/0067455 A1 | 3/2014 | Zhang et al. |

(Continued)

FOREIGN PATENT DOCUMENTS

| | | |
|---|---|---|
| CN | 106330668 A | 1/2017 |
| WO | 2012094469 A2 | 7/2012 |
| WO | 2014053045 A1 | 4/2014 |

OTHER PUBLICATIONS

"Non Final Office Action Issued in U.S. Appl. No. 16/653,645", dated Jun. 25, 2020, 14 Pages.

(Continued)

*Primary Examiner* — Mohamed A. Wasel
*Assistant Examiner* — Rachel J Hackenberg
(74) *Attorney, Agent, or Firm* — NovoTechIP International PLLC

(57) ABSTRACT

A system and method directed to determining one or more polls that a user may have missed during a period of inactivity is provided. Initially, a polling system may determine that a user is now active and may determine one or more polls that were created for or assigned to a user, or a group to which the user belongs, during the period of inactivity. The polling system may then surface a notification and/or an input window such that a user may provide polling input. In some instances, a user may have missed multiple polls; the polls presented to the user may be based on recent user activity and/or whether such missed polls are still live, or open.

20 Claims, 24 Drawing Sheets

(56) References Cited

U.S. PATENT DOCUMENTS

| | | | |
|---|---|---|---|
| 2015/0356468 A1* | 12/2015 | Cummins | H04L 51/046 |
| | | | 705/5 |
| 2017/0063744 A1 | 3/2017 | Banerjee et al. | |
| 2017/0140310 A1 | 5/2017 | Gottemukkala et al. | |
| 2018/0018707 A1* | 1/2018 | Berry, Jr. | H04L 51/046 |
| 2018/0039955 A1 | 2/2018 | Mackenzie et al. | |
| 2018/0089706 A1* | 3/2018 | Li | G06Q 30/0203 |
| 2019/0019204 A1* | 1/2019 | Kopikare | H04L 51/046 |
| 2020/0351225 A1* | 11/2020 | Lenchner | G06F 9/542 |
| 2021/0110414 A1 | 4/2021 | Faulkner et al. | |
| 2021/0117926 A1 | 4/2021 | Faulkner et al. | |

OTHER PUBLICATIONS

"Final Office Action Issued in U.S. Appl. No. 16/653,645", dated Oct. 6, 2020, 12 Pages.

"How Polly Enhances the Microsoft Teams Experience", Retrieved form: https://www.polly.ai/microsoft-teams, Retrieved Date: Apr. 22, 2019, 6 Pages.

Baker, et al., "Application as Filed in U.S. Appl. No. 15/904,221", filed Feb. 23, 2018, 94 Pages.

"International Search Report and Written Opinion Issued in PCT Application No. PCT/US20/054888", dated Dec. 9, 2020, 11 Pages.

"International Search Report & Written Opinion Issued in PCT Application No. PCT/US20/054889", dated Jan. 25, 2021, 11 Pages.

"Survey Monkey", Retrieved From: https://web.archive.org/web/20210311103845/https://www.surveymonkey.com/mp/tour/responsecollection/, Mar. 11, 2021, 19 Pages.

"Non-Final Office Action Issued in U.S. Appl. No. 16/655,661", dated Mar. 17, 2021, 23 Pages.

Final Office Action Issued in U.S. Appl. No. 16/655,661, Dated: Jun. 25, 2021, 25 Pages.

* cited by examiner

FIG. 2D

CATCH-UP POLL: MISSED POLL

BACKGROUND

Communication environments allow users of devices to communicate across a computer network such as the internet. Communication events which can be established include voice calls, video calls, instant messaging, voice mail, file transfer and others. It is known for a user of an instant messaging communication session to create a poll and share the poll with other users of the instant messaging communication session during the session to receive their feedback. The user creating the poll specifies each poll option manually. For example, a user creating a poll to enable a group of friends to decide where to go for lunch finds out the names of nearby restaurants, enters them manually as poll options and shares the poll with the rest of the group. However, manually placed objects designed to collect and report data at a one dimensional level do not take into account poll activity data across environments and groups do not extend user engagement beyond the immediate poll creation and response.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for identifying one or more polls that may have been missed by a user during a period of inactivity. Polls existing in context to chat and channel activity may be manually placed objects or bots designed to collect and report data at a first dimensional level. Poll bubbles however, encourage, engage, collect and expose poll activity data across environments and groups via improved and new multi-dimensional inputs, context, bubble personality and outputs, thereby allowing for group activity, location proximity, role activity, user inputs, data collection, machine pattern learning, intelligent agent suggestions, etc. to push to the top level of a user experience. By including polling activity across applications, systems, environments, and devices, the lifecycle of the group poll activity is better contextually exposed via the reach of poll bubble states across pre, during and post engagement activity and results including unique data input capture and output curation. Thus, for example, quick slider expression of depth of input, word cloud curation results, role based live activity results, suggestive poll content opportunities, pre curated polling options and suggestions, etc. may be made readily available to aid in decision making processes going forward. However, in instances where a user has not completed an intelligent poll bubble, for example, because the user was inactive when the intelligent poll bubble was initially surfaced or presented, a notification may be provided to the user indicating that a poll is available. More specifically, an indication indicating that a period of inactivity is over may be received; one or more polls that were created and/or assigned to the user, or to a group of which the user is a member, may be determined. A notification, and in some instances—a poll window soliciting user information, may be provided to a user interface based on the determination.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

FIG. 2D depicts additional details of a fourth graphical user interface in accordance with examples of the present disclosure;

DETAILED DESCRIPTION

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

As discussed above, in examples where polling may be utilized during events, integrating one or more polling features with one or more existing applications utilized by users, increases usability and provides at least one manner for obtaining user feedback. Moreover, for polls that may have been missed by a user for reasons of user inactivity, a messaging or conference system, upon a login by the user or upon reopening the app after leaving or being inactive for a predetermined amount of time, may check groups, teams, channels, and threads associated with the user for any polls that the user missed during the inactive period. The communication, messaging, conferencing, and collaboration system may then proactively surfaced such polls. The communication, messaging, conferencing, and collaboration system may check for only polls that are still "live" or "not yet close;" or the communication, messaging, conferencing, and collaboration system may check for any polls that the user missed. In some examples, the communication, messaging, conferencing, and collaboration system may check all the groups, teams, channels, and threads associated with the user for any polls that the user previously engaged; the communication, messaging, conferencing, and collaboration system may automatically display an update to the user if a specific status change condition of the poll is met, such as poll is now closed or questions got updated/modified.

Figure 1:
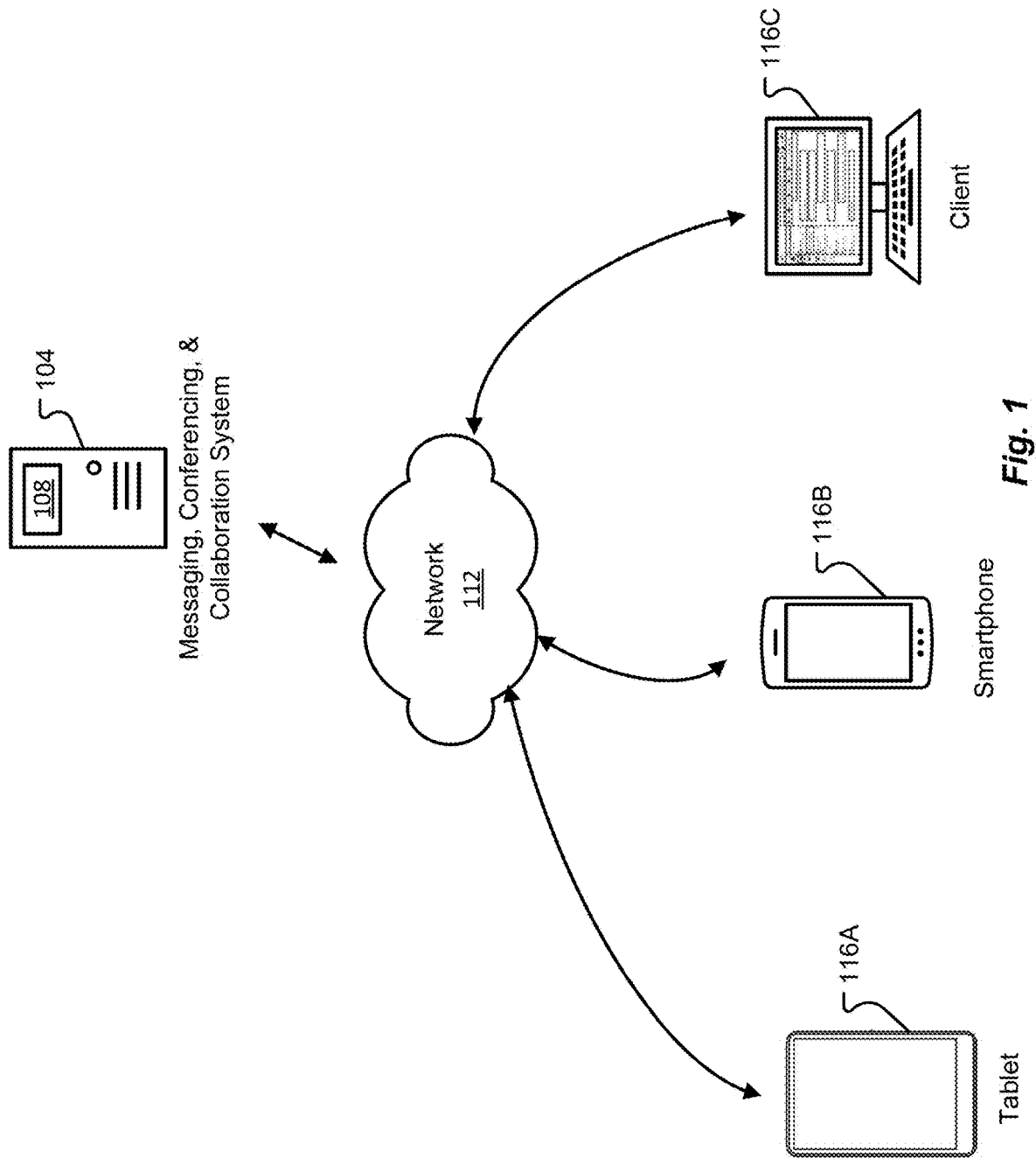
FIG. 1 illustrates details of a communication, messaging, conferencing, and collaboration system in accordance with the aspects a of the disclosure.

FIG. 1 depicts aspects of a communication, messaging, conferencing, and collaboration system 104 in accordance with examples of the present disclosure. The messaging, conferencing, and collaboration system 104 may include a messaging, conferencing, and collaboration system 108; the messaging, conferencing, and collaboration application 108 may reside at a single device, such as a server of the messaging, conferencing, and collaboration system 104, or may be distributed amongst a plurality of servers and/or other devices for instance. In some examples, the conferencing, messaging, and collaboration system 108 may reside in a cloud environment and may be accessible via one or more networks 112 by one or more devices 116A-116C. In some examples, the client device 116A-116C may correspond to a tablet device 116A, a smartphone 116B and/or a tablet 116C. As another non-limiting example, at least one client device 116A-116C may be any device configured to allow a user to use an application such as, for example, a smartphone, a tablet computer, a desktop computer, laptop computer device, gaming devices, media devices, smart televisions, multimedia cable/television boxes, smart phone accessory devices, industrial machinery, home appliances, thermostats, tablet accessory devices, personal digital assistants (PDAs), or other Internet of Things (IOT) devices.

As indicated above, one or more devices 116A-116C may interact with the conferencing, messaging, and collaboration system 104. In some instances, a collaboration application, such as Microsoft Outlook or Microsoft Teams may be installed or otherwise executed at one or more of the devices 116A-116C. Alternatively, or in addition, a browser or other network/web accessible application may interact with the messaging, conferencing, and collaboration system 104 via the network 112.

FIGS. 2A-2L provide example graphical user interfaces 200A-L that may be rendered at a user interface of one or more device 116A-C, where the conferencing, messaging, and collaboration system 104 may cause such graphical user interfaces 200A-L to be rendered. Each of the example graphical user interfaces 200A-L may be divided into to one or more areas, or portions that display information associated with a user and/or allow a user to interact with such information. For example, the graphical user interface 200A-L may include a command bar portion 204, a feed or channel portion 206, a header portion 208, and and/or a channel tab portion 210. While the example graphical user interfaces 200A-L are depicted having the command bar portion 204, the feed or channel portion 206, the header portion 208, and/or the channel tab portion 210, it should be appreciated that the graphical user interfaces 200A-L may include additional or fewer portions and/or may be arranged, configured, and/or positioned in a different manner than that which is illustrated in the graphical user interfaces 200A-L.

The command bar portion 204 may include one or more areas specific to selecting an application, app, script, or view to be provided in the feed or channel portion 206 and/or the channel tab portion 210. That is, the command bar portion 204 may include a plurality of icons which when selected, may cause a corresponding view and/or information of a corresponding view to be provided or displayed in the feed or channel portion 206 and/or the channel tab portion 210. For example, when an activity icon 212 is selected, one or more of user, team, or group activity information may be displayed in the feed or channel portion 206 and/or the channel tab portion 210. Such user, team, or group activity information may be filtered and/or displayed based on a current user logged into or otherwise utilizing the one or more graphical user interfaces 200A-L. In addition, the activity icon 212 may dynamically change to indicate a number 205 of new activities, some of which may be unseen or unviewed by the user, that may have been added, posted, or otherwise made available to a team, group, channel, thread to which the user belongs or is otherwise associated. As another example, when a messaging icon 214 is selected, one or more messages associated with the user, a group to which the user belongs, a team to which the user belongs, and/or a channel to which the user belongs, may be displayed in the feed or channel portion 206 and/or the channel tab portion 210. Such user, team, or group messaging information may be filtered and/or displayed based on a current user logged into or otherwise utilizing the one or more graphical user interfaces 200A-L. As another example, when a team icon 216 is selected, information associated with one or more teams, groups, or organizational units to which the user may belong may be displayed in the feed or channel portion 206 and/or the channel tab portion 210. Such team information may be filtered and/or displayed based on a current user logged into or otherwise utilizing the one or more graphical user interfaces 200A-L. As another example, when the calendar icon 218 is selected, information associated with a calendar application and/or a calendar view graphically depicting one or more events, meetings, or other scheduled or to-be-scheduled items may be displayed in the feed or channel portion 206, the channel tab portion 210, or in an area including both the feed or channel portion 206 and the channel tab portion 210. As another example, when the communication icon 220 is selected, one or more options for communicating with another user, such as chat, phone, video conferencing, audio conferencing, etc. may be displayed in the feed or channel portion 206 and/or the channel tab portion 210. As another example, when the files icon 222 is selected, one or more files associated with the user, group, team, channel, or thread to which the user belongs, or is otherwise associated may be displayed in the feed or channel portion 206 and/or the channel tab portion 210. Such file information may be filtered and/or displayed based on a current user logged into or otherwise utilizing the one or more graphical user interfaces 200A-L.

The feed or channel portion 206 may display one or more feeds, channels, or threads associated with the user, a group to which the user belongs, an organizational unit to which the user belongs, a team to which the user belongs, and/or a thread to with the user belongs or is otherwise associated with. For example, when an activity icon 212 is selected as depicted in the graphical user interface 200A, one or more feeds, or communications associated with the user, may be displayed in the feed or channel portion 206. Upon selection of a feed by the user, for example 224, additional information and/or details associated with the selected feed 224 may be displayed in the channel tab portion 210. The channel tab portion 210 may display, for example, a conversation, files, an organization, activity, etc. associated with user activity and/or the selected feed 224.

As another example, a history of instant messages, or chats, may be displayed in the channel tab portion 210, where the user is associated with one or more of the instant messages, or chats, in the history of the instant messages. Moreover, the channel tab portion 210 may include a scroll bar such that a user may navigate to one or more other instant messages displayed in the instant message history, or feed. The header portion 208 may include a user avatar 226 which may provide identifying information of the user currently logged into, authenticated with, or otherwise associated with the information displayed in the graphical user interface 200A. For example, User Ten may be a user logged into or otherwise utilizing the graphical user interface 200A; accordingly, messaging information, calendar information, etc. may be displayed or otherwise filtered based on User Ten.

Figure 2A:
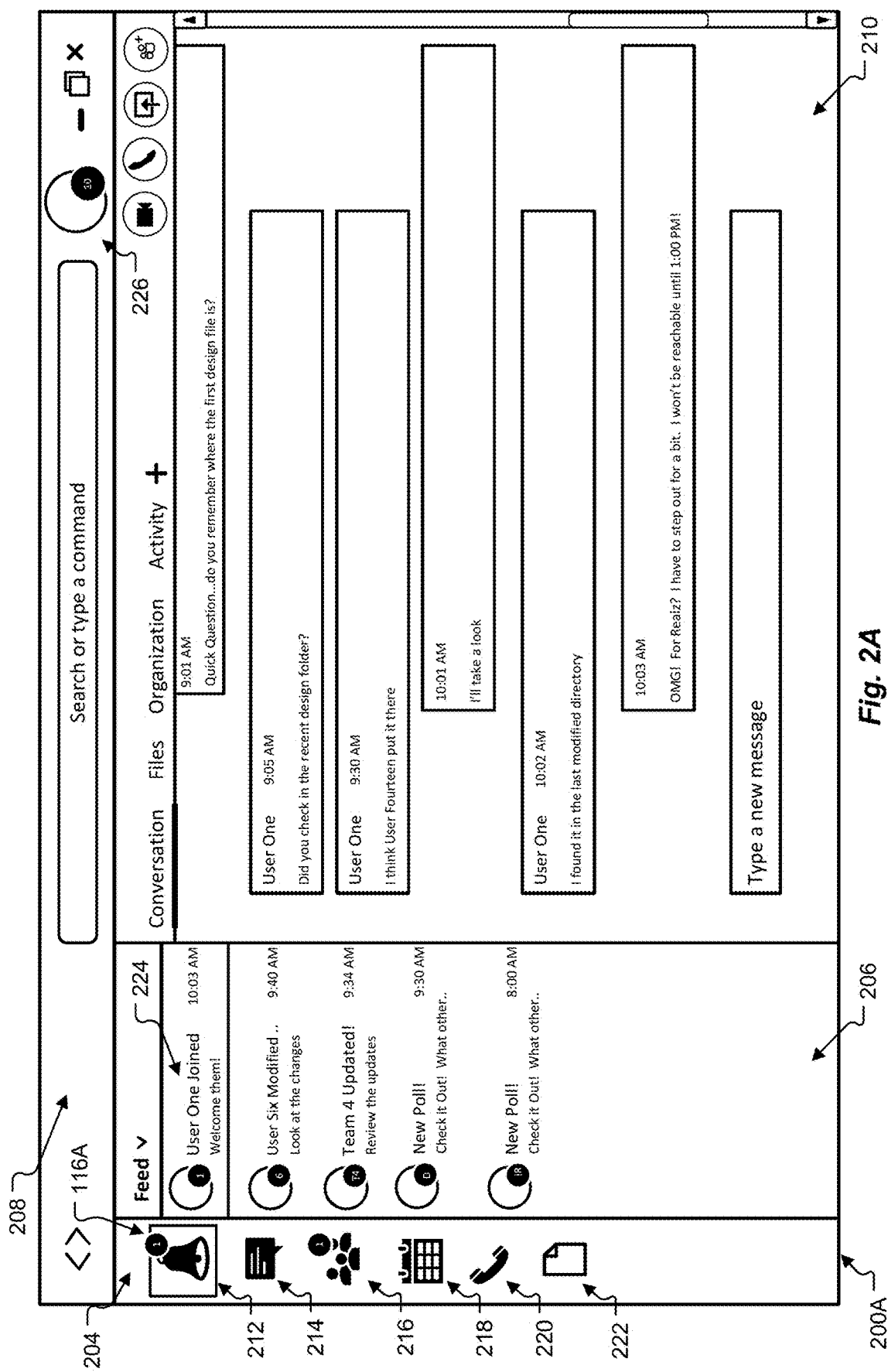
FIG. 2A depicts additional details of a first graphical user interface in accordance with examples of the present disclosure.
Figure 2B:
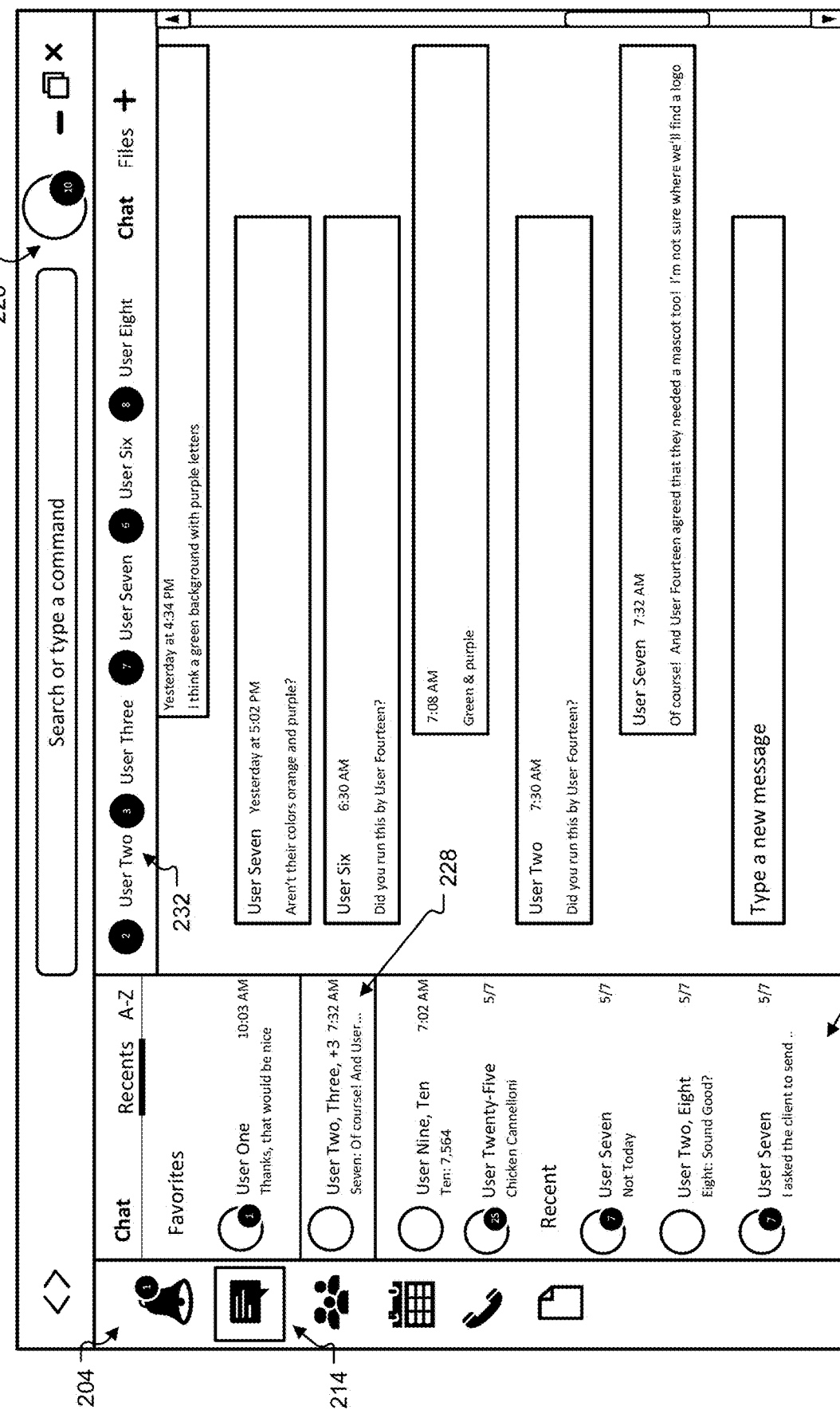
FIG. 2B depicts additional details of a second graphical user interface in accordance with examples of the present disclosure.

FIG. 2B depicts details of a graphical user interface 200B in accordance with examples of the present disclosure. Information in the graphical user interface 200B may be displayed upon a user selecting the messaging icon 214 of the command bar portion 204. Accordingly, the feed or channel portion 206 may display one or more conversations, threads, or instant messages associated with the user, for example User Ten. That is, similar to the activity information previously described, the feed or channel portion 206 may display one or more instant message communications associated with a user. Upon selection by a user, for example if User Ten selected the chat 228, the channel tab portion 210 may display additional information about the selected chat 228. For example, the channel tab portion 210 may display or otherwise identify the users 232 that have been involved with, part of, or otherwise contributed to the selected chat 228. The channel tab portion 210 may illustrate or otherwise render one or more instant messages associated with the selected chat 228. Further, a scroll bar may be provided allowing a user, such as User Ten, to view previous messages associated with the selected chat 228.

Figure 2C:
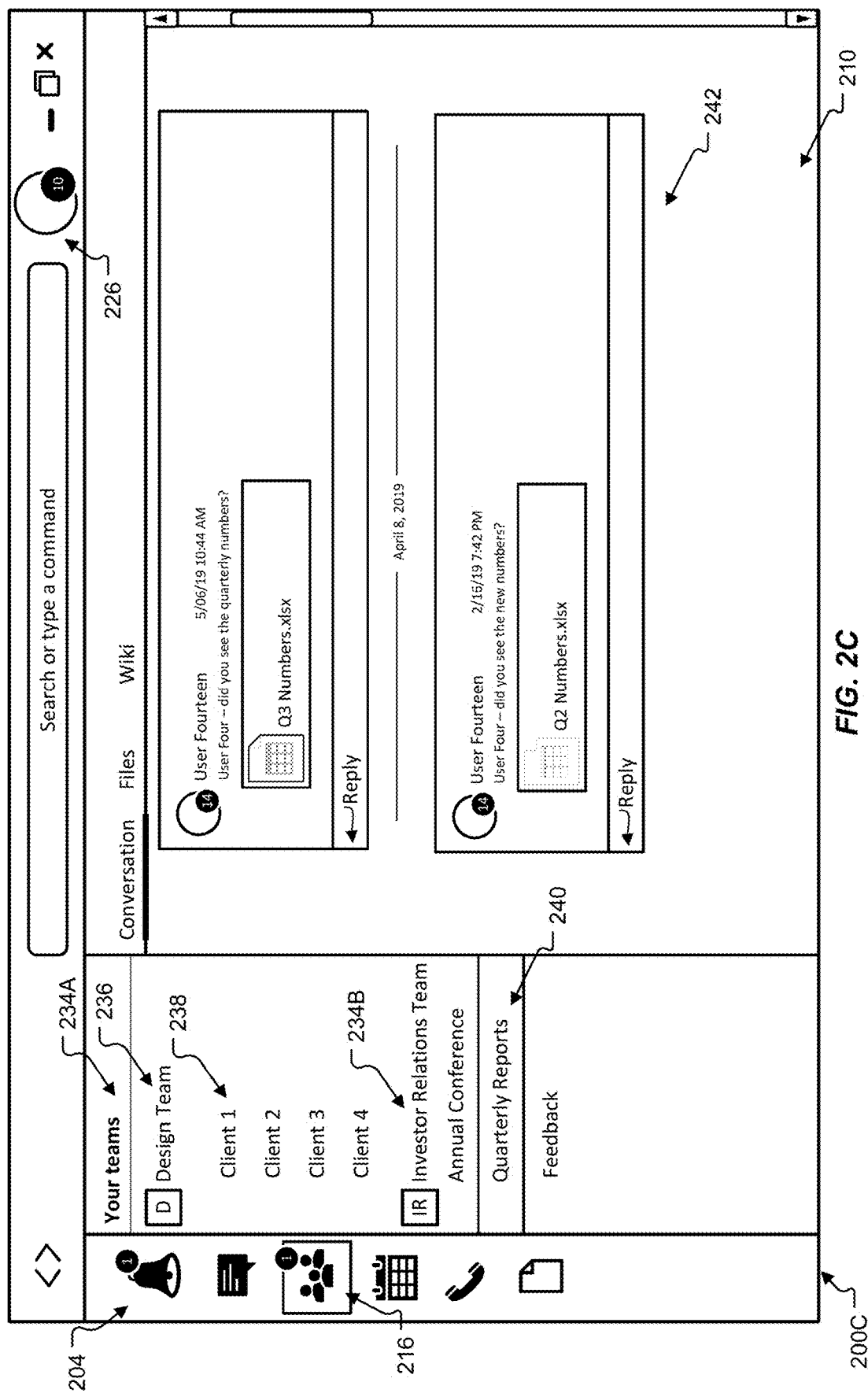
FIG. 2C depicts additional details of a third graphical user interface in accordance with examples of the present disclosure.

FIG. 2C depicts details of a graphical user interface 200C in accordance with examples of the present disclosure. Upon selection of the team icon 216, information associated with one or more teams or groups to which the user may belong may be displayed in the feed or channel portion 206 and/or the channel tab portion 210. For example, the feed or channel portion 206 may display a Design Team 236A which may be subdivided into one or more sub-teams, channels, groups, or threads 238. One or more of the sub-teams, channels, groups, or threads 238 may be associated with the user, User Ten. As another example, an Investor Relations team 234B may be displayed along with sub-team, subgroup, channel, or thread 240. Upon selection of the sub-team, channel, group, or thread 240, the channel tab portion 210 may display additional details associated with the selected sub-team, subgroup, channel or thread. For example, one or more reports uploaded by User Fourteen may be displayed in an area 242. As can be appreciated, the reports themselves may be messages or otherwise may include communications and/or comments from one or more users.

Figure 2D:
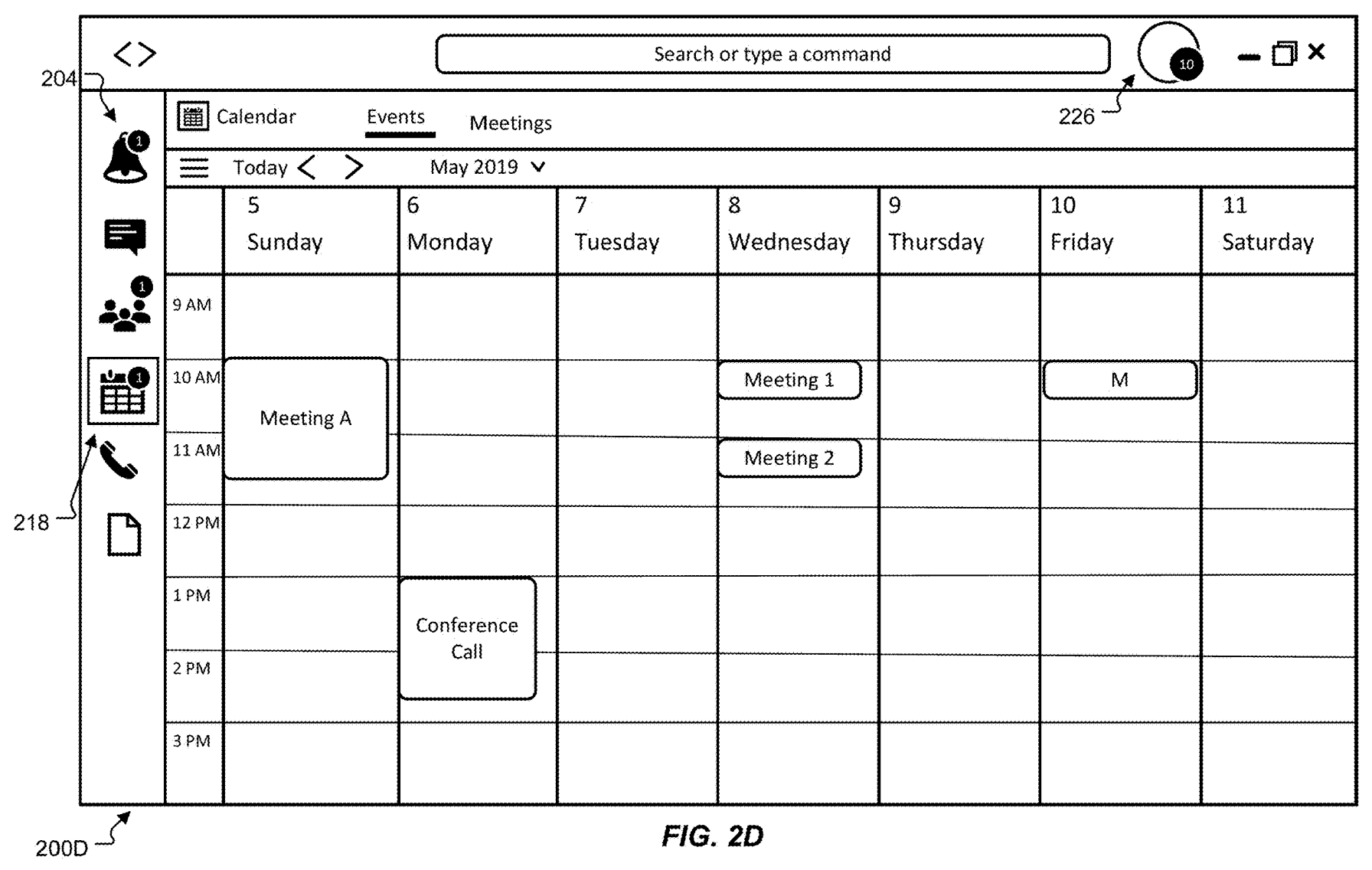

FIG. 2D depicts details of a graphical user interface 200D in accordance with examples of the present disclosure. Upon selection of the calendar icon 218, a calendar view depicting one or more events, meetings, or items of a user's schedule may be displayed. The calendar view may depict meetings, events, conference calls, etc. and may be organized according to date, time, event type (meeting, event, calls etc.). As can be appreciated, the items depicted in the calendar view may originate from or otherwise be pulled from one or more data sources storing such scheduled items. As further depicted in FIG. 2D, the calendar icon 218 may change or otherwise be dynamically updated to reflect any new events, meetings, etc. that may have been added to a user's calendar which the user may or may not have previously viewed or seen.

Figure 2E:
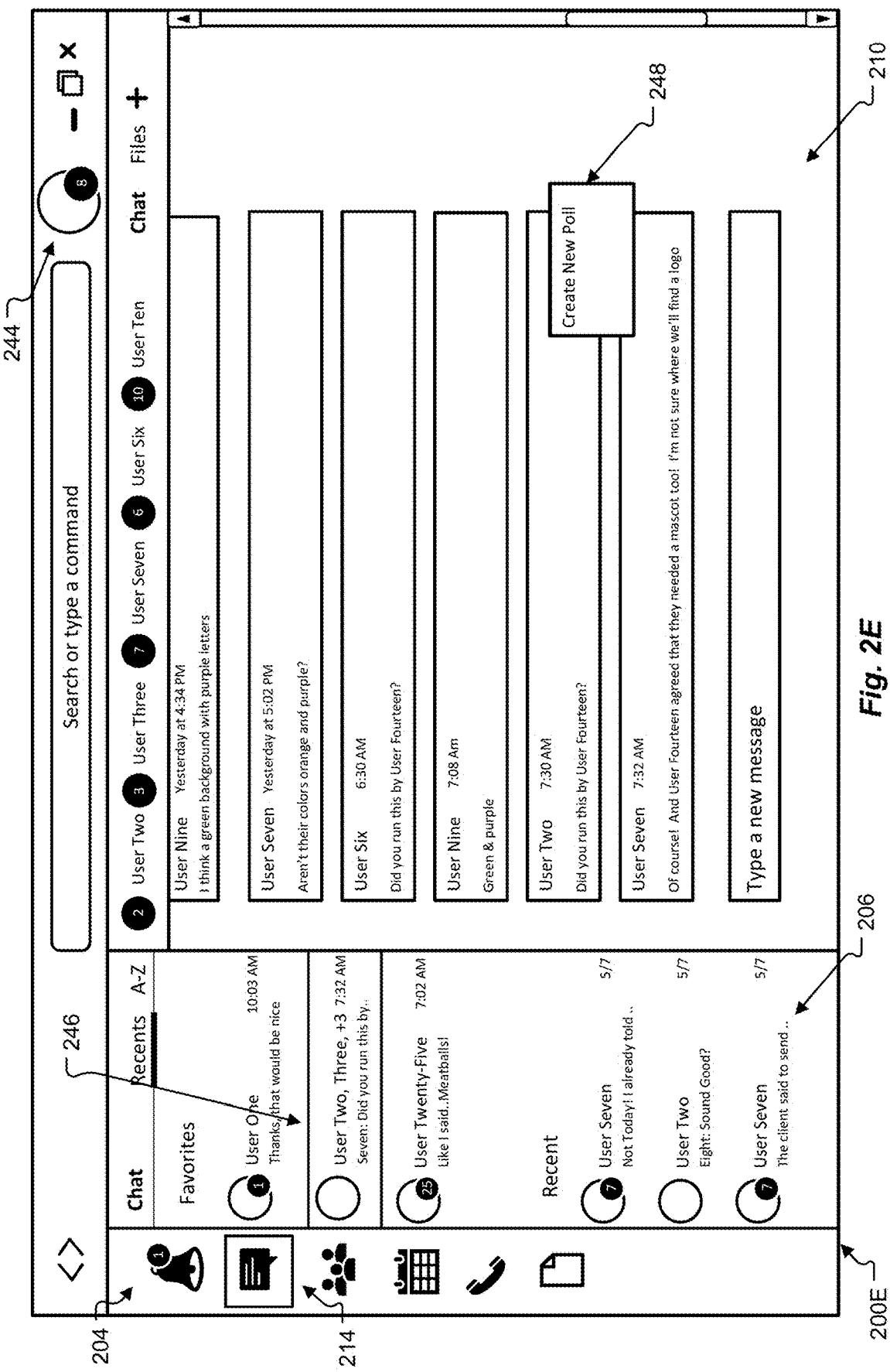
FIG. 2E depicts additional details of a fifth graphical user interface in accordance with examples of the present disclosure.

In accordance with examples of the present disclosure, a user, such as User Eight, may wish to solicit information from one or more users. Thus, the communication, messaging, conferencing, and collaboration system 104 may provide the ability for one or more users to create a poll, or survey, to obtain or otherwise gather information from one or more users. A poll is generally used to ask one simple question while a survey is generally used to ask a wide range of multiple questions. A poll, or survey, may be created at any point and/or at any time when a user interacts with the graphical user interface, such as the graphical user interfaces 200A-200D as previously described as well as graphical user interfaces 200E-200L. For example, during an instant messaging session, such as a selected instant message chat 246, a user, such as User Eight (244) may decide to create a poll to collect information from the users participating in the selected instant message chat 246. In some non-limiting examples, the poll or survey may collect information from users grouped by a specified team, channel, group, subgroup, chat, or thread. A user may initiate the creation of a poll, or survey, by right-clicking in the area 248 and selecting Create New Poll as depicted in FIG. 2E. As another example, a user may select a menu drop down from the graphical user interface 200E.

Figure 2F:
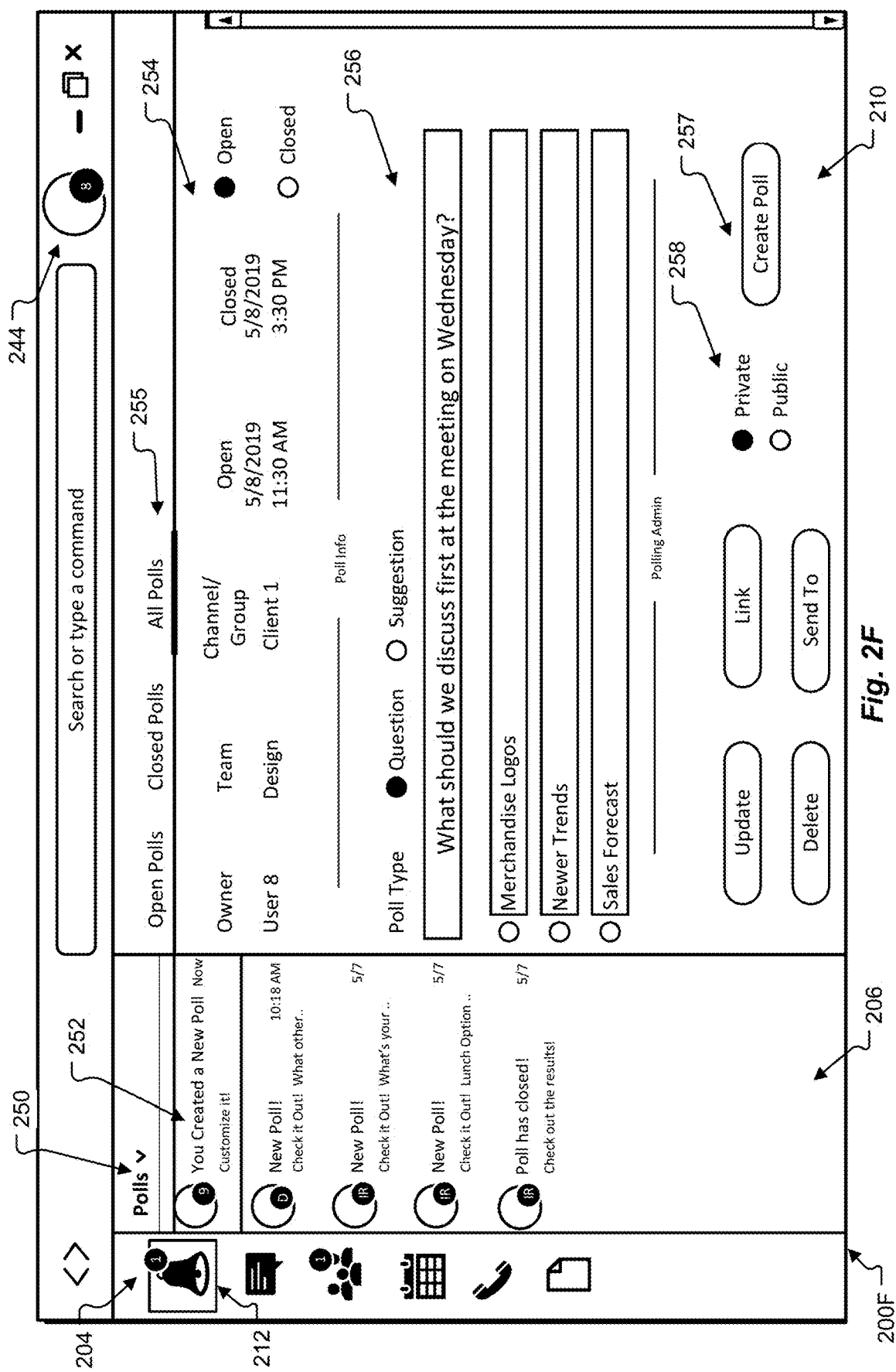
FIG. 2F depicts additional details of a sixth graphical user interface in accordance with examples of the present disclosure.

FIG. 2F depicts additional details related to the poll, or survey, creation process. For example, poll related information 254 may be displayed and may indicate an owner of the poll (User Eight), a team to which the poll has been assigned (e.g., the Design Team), one or more channels that the poll may be associated with or otherwise assigned to (e.g., Client 1), and an open or start time of the poll and a close or end time of the poll. Such features may be selected by the user during a poll configuration process. The user may also select a type of poll, such as a question or suggestion, where a question would solicit feedback from the user and a suggestive poll may provide one or more suggestions based on information in one or more feeds, teams, polls, channels, or groups. As further depicted in the graphical user interface 200F, the user may configure the poll such that the poll is private or public utilizing the public/private indication 258, as well as provide additional options specific to one or more administrative features of the poll. Upon creating the poll utilizing the create button 257, the poll, or survey, may assigned to the selected or otherwise designated users and may be open for accepting results, or soliciting information from the one or more designated users between the start and end times of the poll.

Although the graphical user interface 200F displays details of the poll creation process, the graphical user interface 200F may also display information according to a selected view of the user. For example, a user may have the option to display all polls 255, closed poles, and/or just open poles. Thus, the user may be able to select one or more polls to provide information and/or edit a poll which the user previously created or otherwise possess credentials to do so. Further depicted in the graphical user interface 200F, a list of activities associated with a polling creation process may also be displayed in the feed or channel portion 206.

Figure 2G:
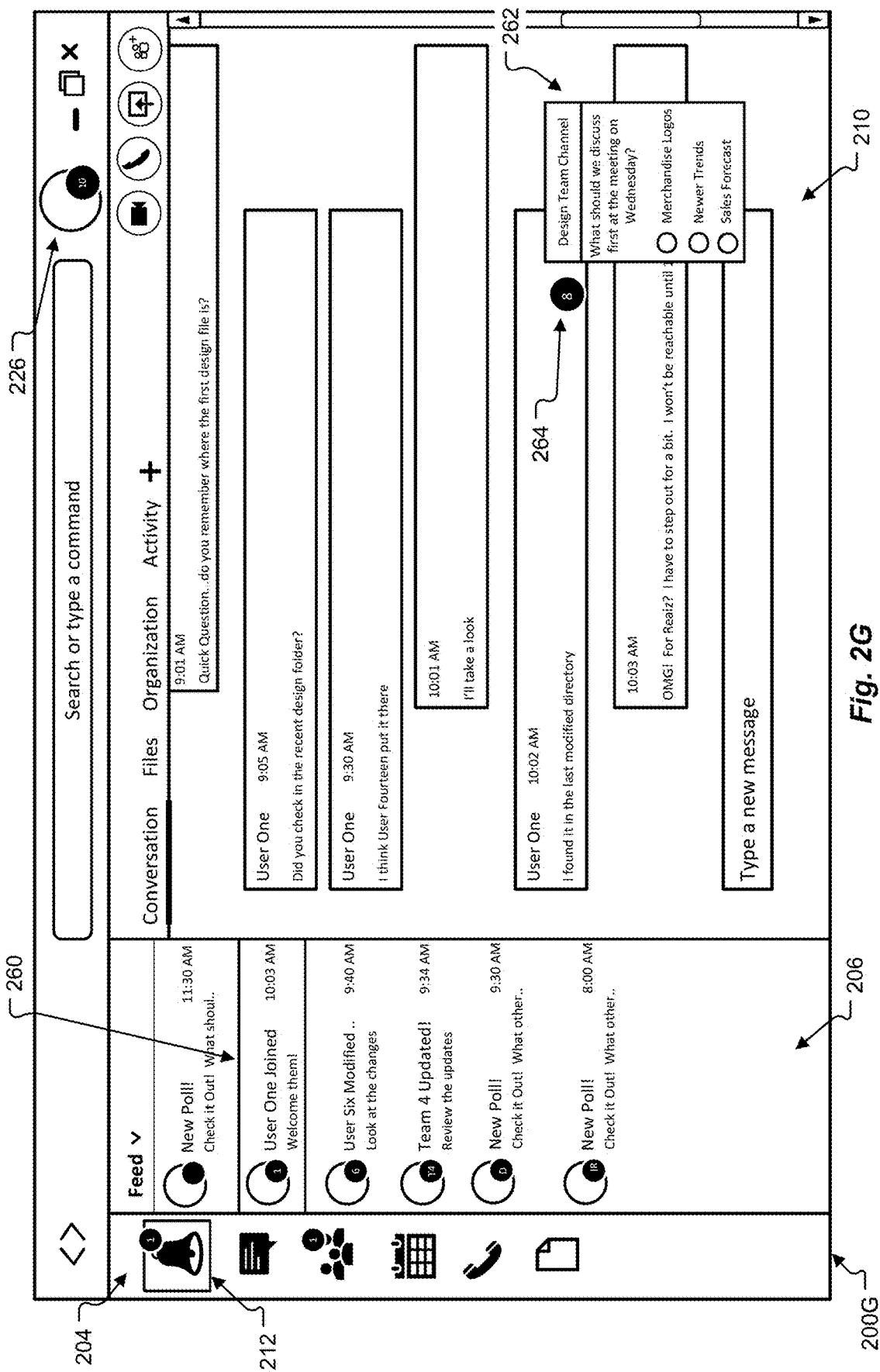
FIG. 2G depicts additional details of a seventh graphical user interface in accordance with examples of the present disclosure.

FIG. 2G depicts details of a graphical user interface 200G in accordance with examples of the present disclosure. As depicted in FIG. 2G, the creation of the poll by User Eight for example, may cause a depiction of the created poll, such as a poll window 262, to appear in any of the command bar portion 204, the feed or channel portion 206, the channel tab portion 210, and/or the header portion 208. Moreover, the poll window 262 may appear in any of the applications or apps corresponding to the one or more icons 201-222. FIG. 2G depicts an instance where upon creation of the poll by User Eight, a poll window 262 associated with the poll created by User Eight may be immediately surfaced for any users belonging to a group to which the new poll was assigned. Accordingly, as User Ten may belong to a team or group, such as a "Design Team Channel," a poll assigned to the "Design Team Channel" would be presented, in some instance immediately, to User Ten upon the creation of the poll by User Eight.

Figure 2H:
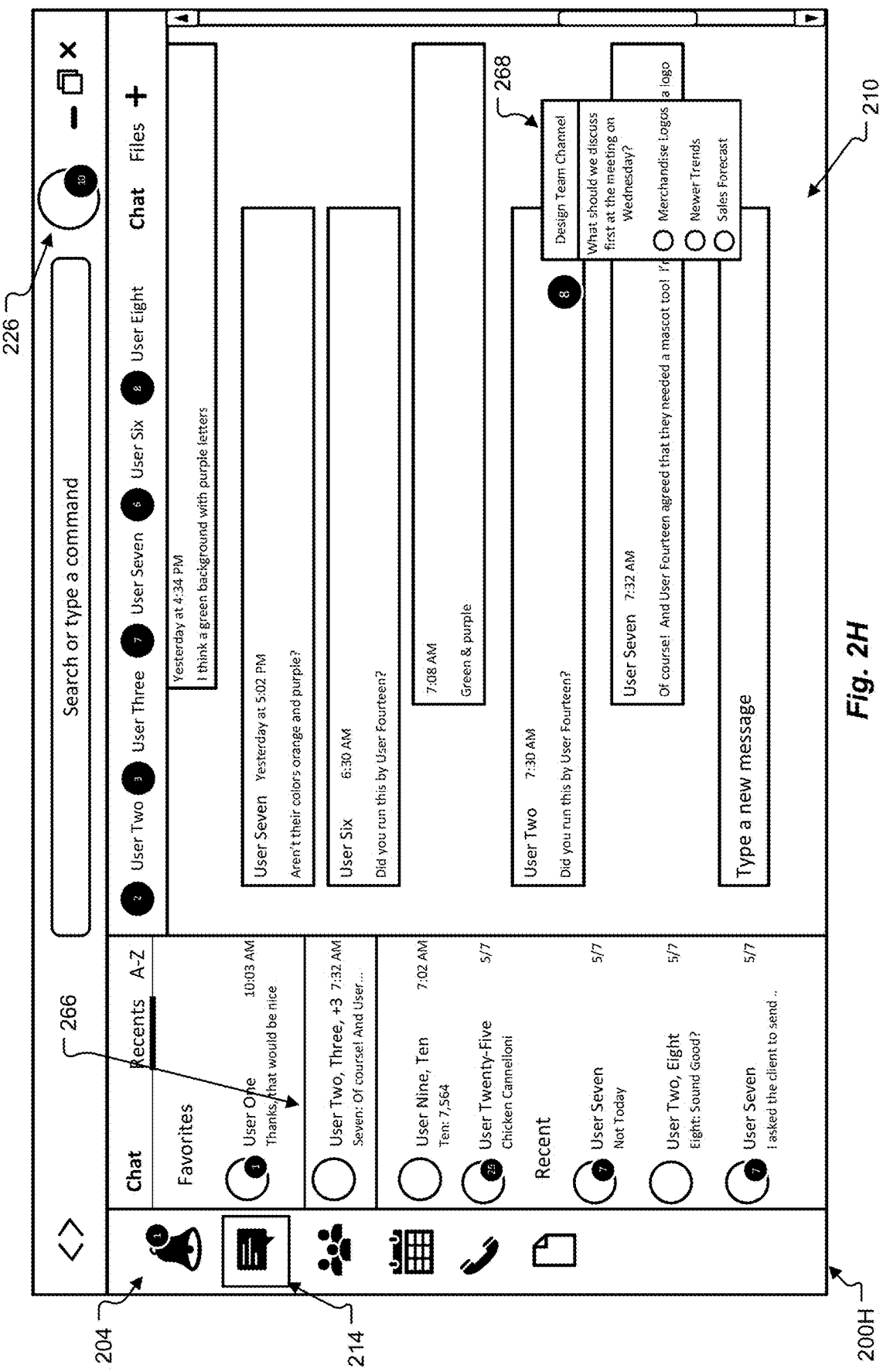
FIG. 2H depicts additional details of a eighth graphical user interface in accordance with examples of the present disclosure.
Figure 2I:
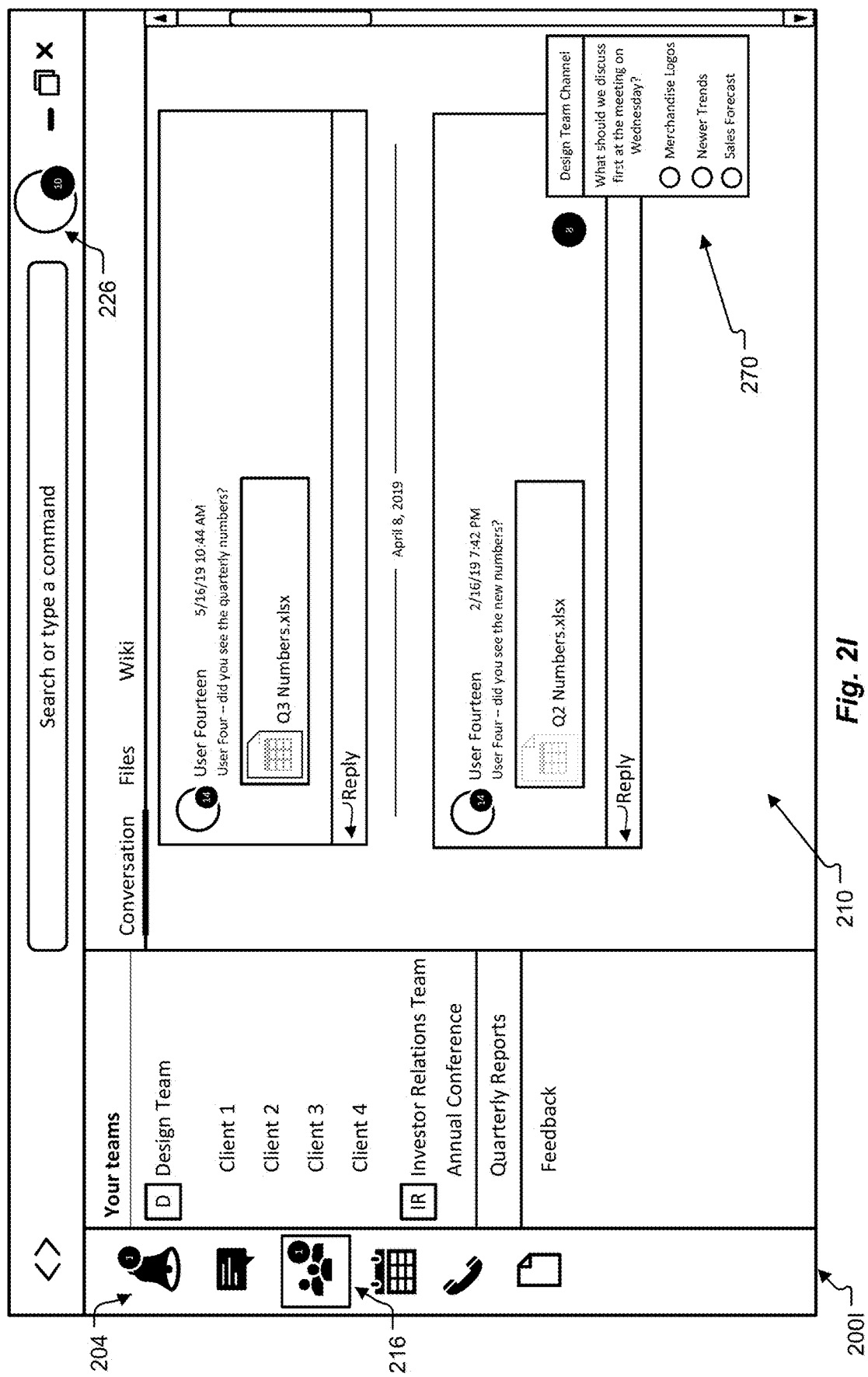
FIG. 2I depicts additional details of a ninth graphical user interface in accordance with examples of the present disclosure.

In accordance with some examples, a poll window 268 may surface when a user is viewing one or more messages associated with the user, a group to which the user belongs, a team to which the user belongs, and/or a channel to which the user belongs, in the feed or channel portion 206 and/or the channel tab portion 210 as depicted in the graphical user interface 200H of FIG. 2H. Similarly, a poll window 270 may surface when a user is viewing information associated with one or more teams or groups to which the user may belong in the feed or channel portion 206 and/or the channel tab portion 210 as depicted in the graphical user interface 200I of FIG. 2I. Similar to FIGS. 2G and 2H, a poll window 272 may surface when a user is viewing information associated with a calendar application and/or a calendar view graphically depicting one or more events, meetings, or other scheduled or to-be-scheduled items in the feed or channel portion 206, the channel tab portion 210, or in an area including both the feed or channel portion 206 and the channel tab portion 210 as depicted in the graphical user interface 200J of FIG. 2J. That is, a poll window 272 may partially obstruct at least a portion of the calendar view depicted in the graphical user interface 200J and is not anchored to any one specific location in the graphical user interface 200J. Alternatively, or in addition, a surface poll window, such as poll window 272, may be anchored to a specific location on a graphical user interface. For instance, the poll window 272 for example, may be surfaced in a location that is most likely to be viewed by a user. Alternatively, or in addition, the poll window 272 may surface in a location that is least likely to be viewed by a user—so as not to immediately distract a user. Such surfacing may be controlled by one or more surfacing parameters set by a user or an administrator.

Figure 2J:
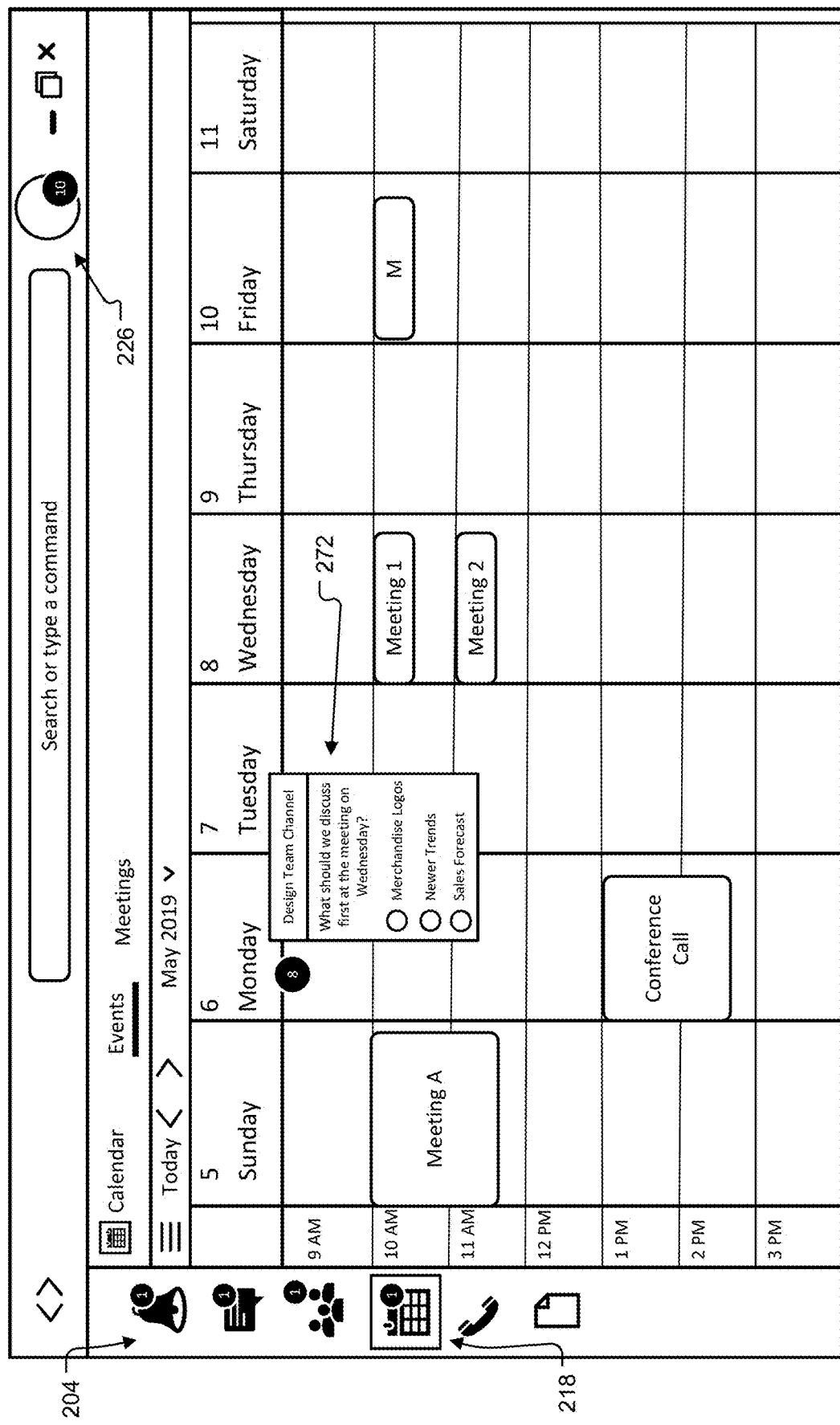
FIG. 2J depicts additional details of a tenth graphical user interface in accordance with examples of the present disclosure.
Figure 2K:
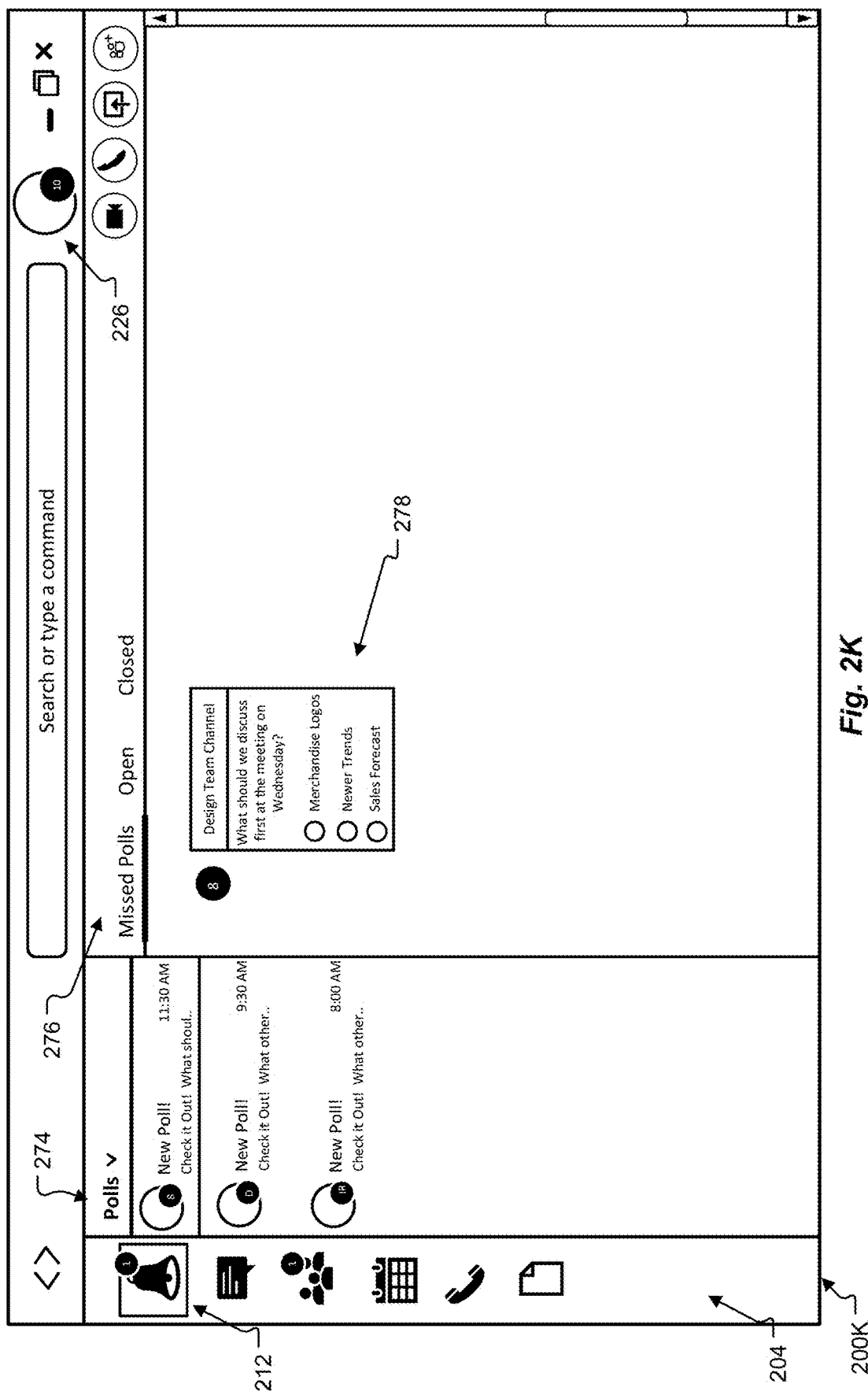
FIG. 2K depicts additional details of a eleventh graphical user interface in accordance with examples of the present disclosure.
Figure 2L:
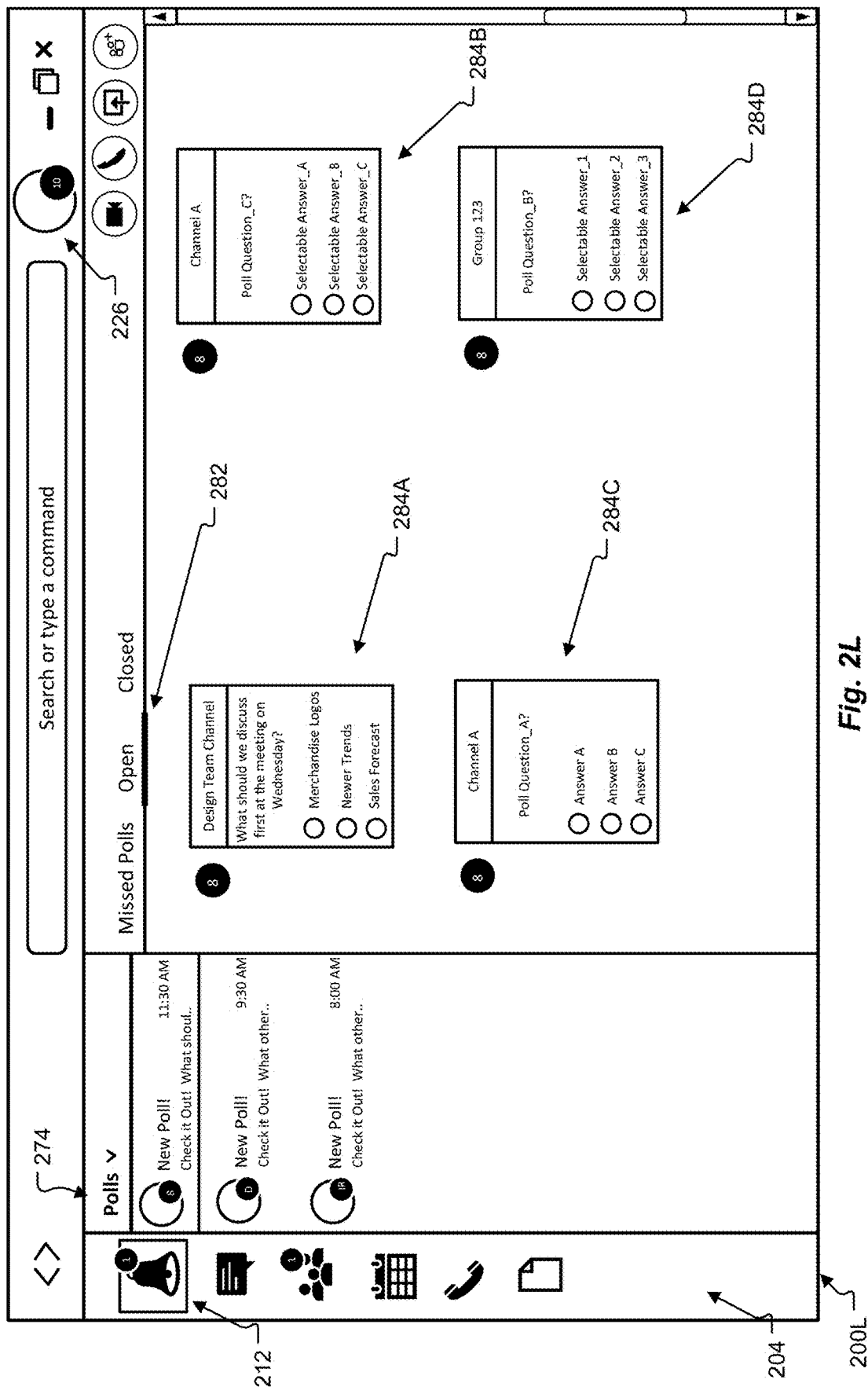
FIG. 2L depicts additional details of a twelfth graphical user interface in accordance with examples of the present disclosure.

In accordance with some examples of the present disclosure, and as depicted in FIG. 2J, a user may view missed polls by selecting on a missed poll tab 276 for example. Alternatively, or in addition, missed polls may be accessible by selecting recent activity 212 and further filtering the recent activity in accordance with a polls filter 274. Accordingly, a user may select a new poll to view and a poll window associated with the poll, such as poll window 278, may be surfaced or otherwise made available to the user. In accordance with some examples of the present disclosure, a user may view all open polls as depicted in FIG. 2L by selecting the open polls tab 282 of the graphical user interface 200L. For example, a user may view polls that may or may not have been surfaced before the user. As depicted in FIG. 2L, poll windows 284A-D may correspond to open polls that the user may complete.

In accordance with some examples of the present disclosure, when user activity or interaction enters an inactive state and/or a user logs out of the communication, messaging, conferencing, and collaboration application for example, the communication, messaging, conferencing, and collaboration system 108 may track or otherwise record which polls, and therefore poll windows, were assigned to a user during the period of inactivity. Accordingly, when the user logs back in or the period of inactivity ends, the communication, messaging, conferencing, and collaboration system 108 may cause each of the missed polls that were previously assigned to the user during the periods of inactivity to be surfaced. In some instances, a period of inactivity may correspond to an amount of time that passes without user interaction at a graphical user interface—for example, if a user does not interact with a graphical user interface for x amount of time, the user may be considered to be inactive. In some instances, a user account may transition from an inactive state to an active state when activity is detected at a user interface or, for example, a user logs into a user account. Accordingly, an inactive state may correspond to a period of time between the last active state and the most recent active state.

Referring again to FIG. 2G, the creation of the poll by User Eight for example, may occur when User Ten is logged out, away from the client device, or otherwise during a period of inactivity associated with User Ten. When the period of inactivity associated with User Ten ends, the communication, messaging, conferencing, and collaboration system 108 may cause a depiction of the created poll, such as a poll window 262, to appear in any of the command bar portion 204, the feed or channel portion 206, the channel tab portion 210, and/or the header portion 208. Moreover, the poll window 262 may appear to persist, or remain visible as a user interacts with a graphical user interface. That is, the poll window 262 may appear in any of the applications or apps corresponding to the one or more icons 2012-222 and may be presented within each application or app as a user navigates through different applications or apps, thereby making it appear as if the poll window 272 is following the user, or following the user activity. Accordingly, because the poll was created and assigned to a user during a period of user inactivity, the communication, messaging, conferencing, and collaboration system 108 may ensure the user views such poll by surfacing the poll before the user. The surfaced polls may correspond to all polls that were created and/or assigned to the user during the period of inactivity. Alternatively, or in addition, only a most recent number of polls may be surfaced before the user. Alternatively, or in addition, the communication, messaging, conferencing, and collaboration system 108 may surface only those polls which were created and/or assigned to the user during the period of user inactivity for the channels, groups, threads, teams, etc. of which the user was recently active in or otherwise indicates recent activity by the user. For example, the user may have been active in the Design Team Channel prior to a period of inactivity; thus, any polls within the Design Team Channel created during the period of user inactivity may be surfaced before the user, as depicted in FIGS. 2G-2J.

In accordance with some examples of the present disclosure, a user may view missed polls that were created and/or assigned to the user during the period of user inactivity by selecting a missed poll tab 276, for example, in the graphical user interface 2K. The missed poll tab 276 may correspond to any area within the conferencing, communication, messaging, and collaboration application configured to display one or more missed poll windows. Alternatively, or in addition, missed polls that occurred during the period of user inactivity may be accessible by selecting recent activity 212 and further filtering the recent activity in accordance with a poll filter 274. Accordingly, a user may select a new poll to view and a poll window associated with the poll, such as poll window 278, may be surfaced or otherwise made available to the user.

Figure 2M:
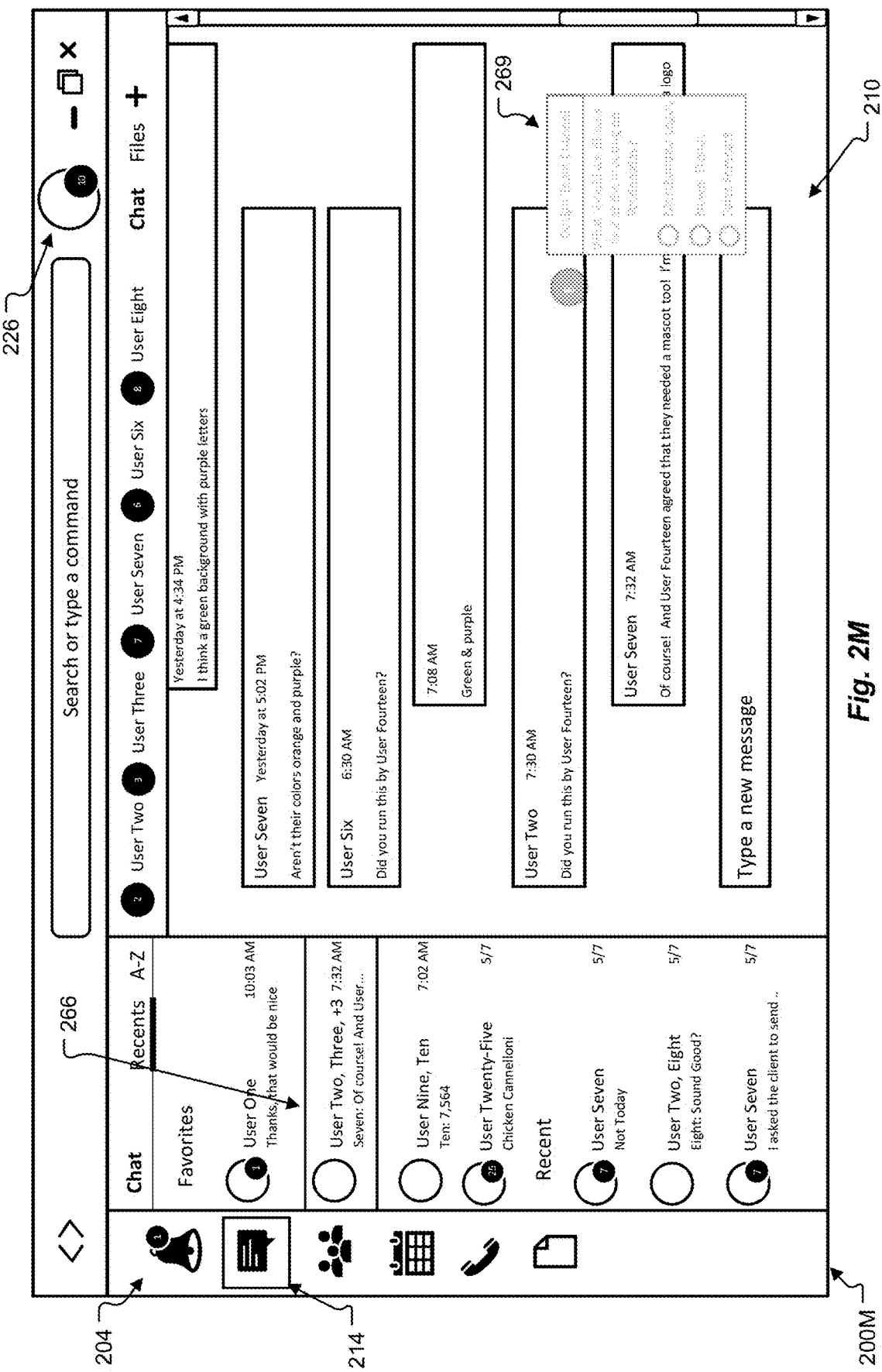
FIG. 2M depicts additional details of a thirteenth graphical user interface in accordance with examples of the present disclosure.

Referring now to FIG. 2M, an example surface and fade of a poll window 269 is depicted in accordance with examples of the present disclosure. More specifically, the poll window 269 may correspond to the poll window 268 of the graphical user interface 200H, where the poll window 269 may be illustrated as being displayed later in time than the poll window 268. That is, a user may interact with, for example, by clicking on the poll window 268; once interaction with the poll window has been detected, the poll window may fade due to inactivity. Accordingly, a poll window 268 may be initially surfaced and then fade as poll window 269. In some examples, the poll window 269 may fade due to inactivity on the part of the user and/or inactivity of the graphical user interface 200M.

Figure 2N:
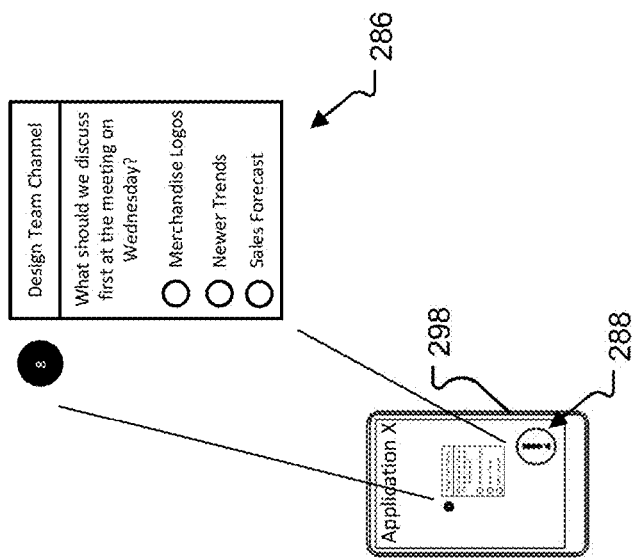
FIG. 2N depicts additional details of a display providing a graphical user interface with a notification in accordance with examples of the present disclosure.

Referring now to FIG. 2N, an example notification provided at computing device is depicted in accordance with examples of the present disclosure. More specifically, the notification may occur at a display of the computing device 298, where the computing device 298 may be the same as or similar to one or more of the computing devices 116 previously described. In some examples, the notification may correspond to a notification 288; alternatively, or in addition, the notification may correspond to a poll window 286. In some instances, the notification may appear and fade away if no interaction is detected within a period of time; in other instances, the notification may appear in a foreground of a display until a user interacts with the notification in some manner. In addition, interacting with the notification 288 may cause the poll window 286 to appear. In some examples, the notification, such as notification 288, may appear at a location other than a main display of a computing device. For example, such notification may be displayed or otherwise indicated at a notification and/or messaging area of a computing device, where the notification and/or messaging area is different from a main display of the computing device. In some examples, the notification may be provided in the form of an audio tone or haptic feedback. In some examples, the type of notification, such as whether to display a poll window 286 and/or whether to display a notification 288, may be based on the computing device a user is utilizing, a location of the user, and/or an application currently being executed or otherwise running at the computing device 298. As one example, a notification 288 may be displayed at a device 298 if a user is not located near another device. As another example, a notification 288 may be displayed at the device 298 if a user is located in a specific room, such as a meeting room and/or if a group poll has been initiated. As one example, a notification 288 may be displayed at a device 298 depending on a state of the device 298, a stated of another device such as a computing device, and/or a state of another entity, such as whether a group meeting is in progress. In some instances, a focus of activity across one or more devices may be utilized to determine how a notification is presented or otherwise surfaced to a user and/or a device of a user. For example, a user may be presenting on a primary screen of a device; based on the context of the device, such as device type, application being executed at the device, a mode of the application and/or device etc., the notification 288 may then be determined to be presented to the primary screen of a selected device. As another example, one or more users may be engaged in a white boarding process, where multiple devices and one or more focuses may determine where the notification 288 is surfaced. Accordingly, user activity, device activity, and/or activity focus may be utilized to determine where and how the notification 288 is presented to a user and/or device of a user. In some instances, the notification 288 may be presented to a set of devices such that the notification 288 is presented substantially at the same time on the set of devices. Although 298 is depicted as being a single device, it should be understood that 298 may include a plurality of devices.

Figure 3:
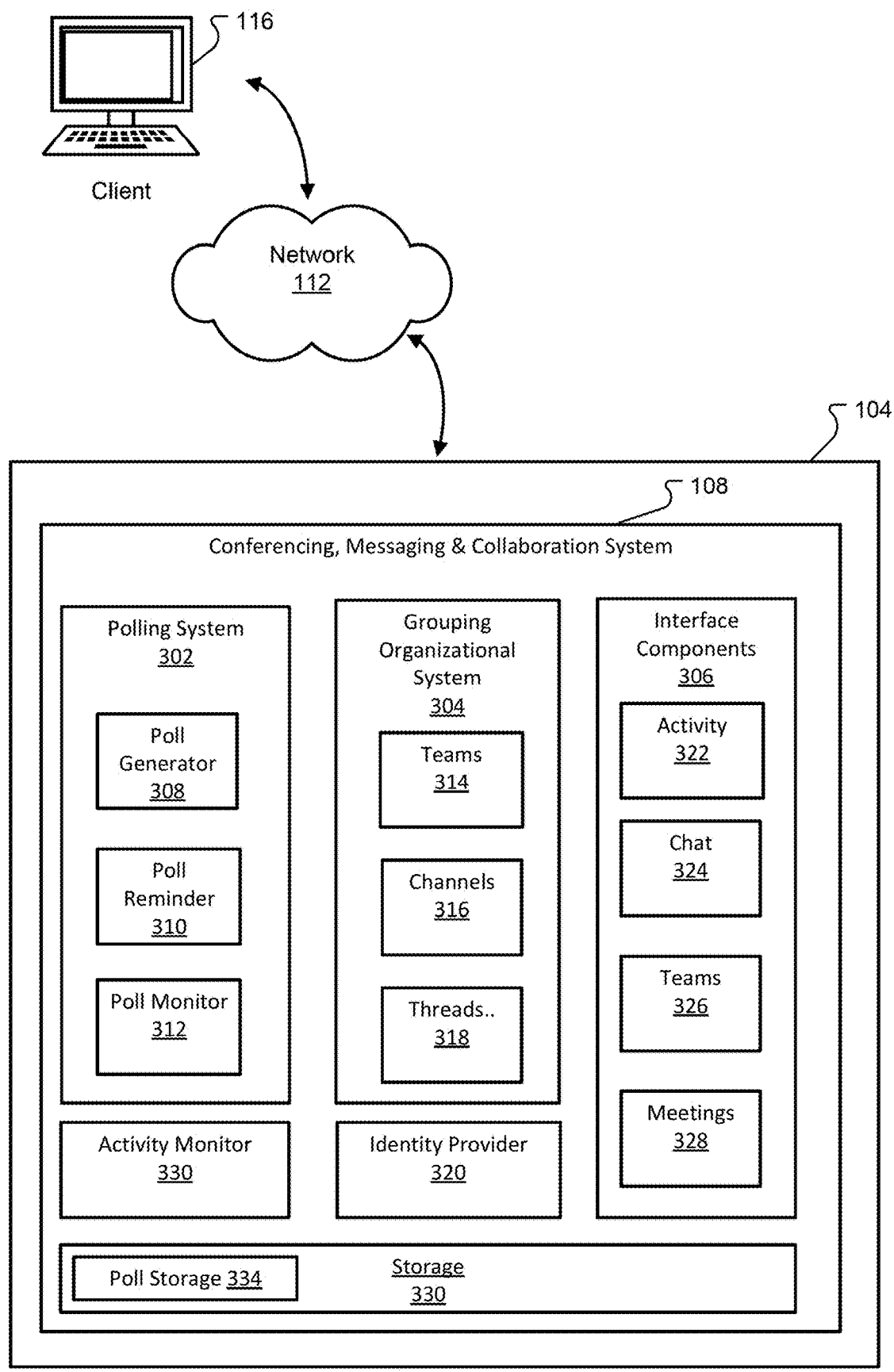
FIG. 3 depicts details of the communication, messaging, conferencing, and collaboration system in accordance with examples of the present disclosure.

FIG. 3 depicts additional details of the communication, messaging, conferencing, and collaboration system 108 in accordance with examples of the present disclosure. More specifically, FIG. 3 depicts a communication, messaging, conferencing, and collaboration system 104 which may reside at one or more data processing devices, such as one or more servers or the like, and may include the messaging, conferencing, and collaboration system 108 as previously described. The communication, messaging, conferencing, and collaboration system 108 may include a polling system 302, a grouping organizational system 304, interface components 306, an identity provider 320, and storage 332. The communication, messaging, conferencing, and collaboration system 108 may also include an activity monitor 330 for monitoring, or tracking, a user's activity, such that if a poll is assigned to the user, or a group to which the user is a member, while the user is inactive, the activity monitor 330 may determine which polls should be surfaced before the user or otherwise provide such activity/inactivity information to a poll monitor 312 and/or a poll reminder 310.

The grouping organizational system 304 generally provides a way to hierarchically organize users, projects, tasks, communications, and user interactions in such a manner so as to foster collaboration and organization in team environments. In accordance with examples of the present disclosure, the grouping organizational system 304 may allow one or more users to be organizationally assigned or otherwise grouped according to one or more teams 314. Further, a user may be grouped or otherwise assigned to one or channels 316, where each channel 316 may include one or more threads 318. Of course, each thread 318 may be further divided if need be as indicated by the ellipses. The interface components 306 generally correspond to the one or more icons in the command bar portion 204 of the graphical user interfaces 200A-L. The interface components 306 generally provide one or more options for allowing a user to interact with the communication, messaging, conferencing, and collaboration system 108. Accordingly, a user may see latest activity utilizing the activity component 322, chat and communicate with instant messages using the chat component 324, change assignments, view documents, subdivide tasks, and manage groupings utilizing the teams component 326, hold meetings utilizing the meetings component 328, and view, track, schedule, and change events, meetings, or other scheduled items utilizing the calendar component not shown. The identity provider 320 is generally responsible for determining a user's identity through an authentication process and enforcing one or more access controls for allowing and/or restricting access to one or more groups and/or interface components. The one or more access controls for allowing and/or restricting access to one or more groups and/or one or more interface components may also depend on a role assigned to a user. For example, a role may determine what permissions and/or what access a user has within or for another object. In some examples, the role may before an organizational unit and/or for a component of the organizational unit. For example, a user assigned to a team may be assigned to a team role providing the user access to one or more areas of the team but may restrict the user from adding content and/or creating polls. In some examples, a user may be assigned multiple rolls. The role may dictate which users have access to which resources and how such resources may be utilized; a role may dictate which resources have access to which users how the resource can interact with the users. As one example, a surfacing of a polling window may depend on whether a resource has sufficient privileges and/or access rights to surface a window in front of a user. In some examples, a surfacing of a polling window may depend on whether a user has sufficient privileges and/or access rights for the window to be surfaced in front of a user and/or how the window can or is surfaced.

The polling system 302 may include one or more components responsible for implementing polls and/or surveys in accordance with examples of the present disclosure. More specifically, the polling system 302 may include a poll generator 308, a poll reminder 310, and a poll monitor 312. The poll generator 308 provides the ability for a user to create, manage, and assign one or more polls to one or more events, persons, users, and/or objects. For example, the poll generator 308 may generate poll information that is not just accessible to a user, but may be accessible to one or more other components of the communication, messaging, conferencing, and collaboration system 104. In some examples, the identity provider 320 may be relied upon by the polling system 302 to ensure that the correct users have the necessary permissions to interact with a poll or survey. Thus, a user may create a poll and assign the poll to one or more users. The polling system 302 may then communicate with the activity monitor 330 to determine which polls may have been assigned to a user during a period of user inactivity. For example, a user may be inactive for a period of time; during such time, one or more polls may have be assigned to the user. The poll monitor 312 may determine, based on activity and inactivity information for the user as provided by the activity monitor 330, which polls were assigned when the user was inactive. Accordingly, the poll monitor 312 may provide a list of polls to the poll reminder 310 to cause such polls, or poll windows, to be surfaced before or otherwise in front of the user when the period of inactivity ends. In some instances, the polling system 302 may store poll information and/or inactivity/activity information for a user in a poll storage 334 of the storage 332.

As previously discussed, the poll monitor 312 may monitor which users have responded to a particular poll. For example, if a group to which a first user belongs was assigned a poll, and/or if the user was directly assigned a poll, the poll monitor 312 may determine whether the user responded to the poll. Thus, the poll monitor may track which users have responded and which users have not responded. The poll monitor 312 may provide a notification to the poll reminder 310 and together with the activity/inactivity information from the activity monitor 330, may determine that a user has not responded to a poll attributable at least in part to a period of user inactivity. Accordingly, the poll reminder 310 may act as a notification module to cause one or more polls to be surfaced.

Figure 4:
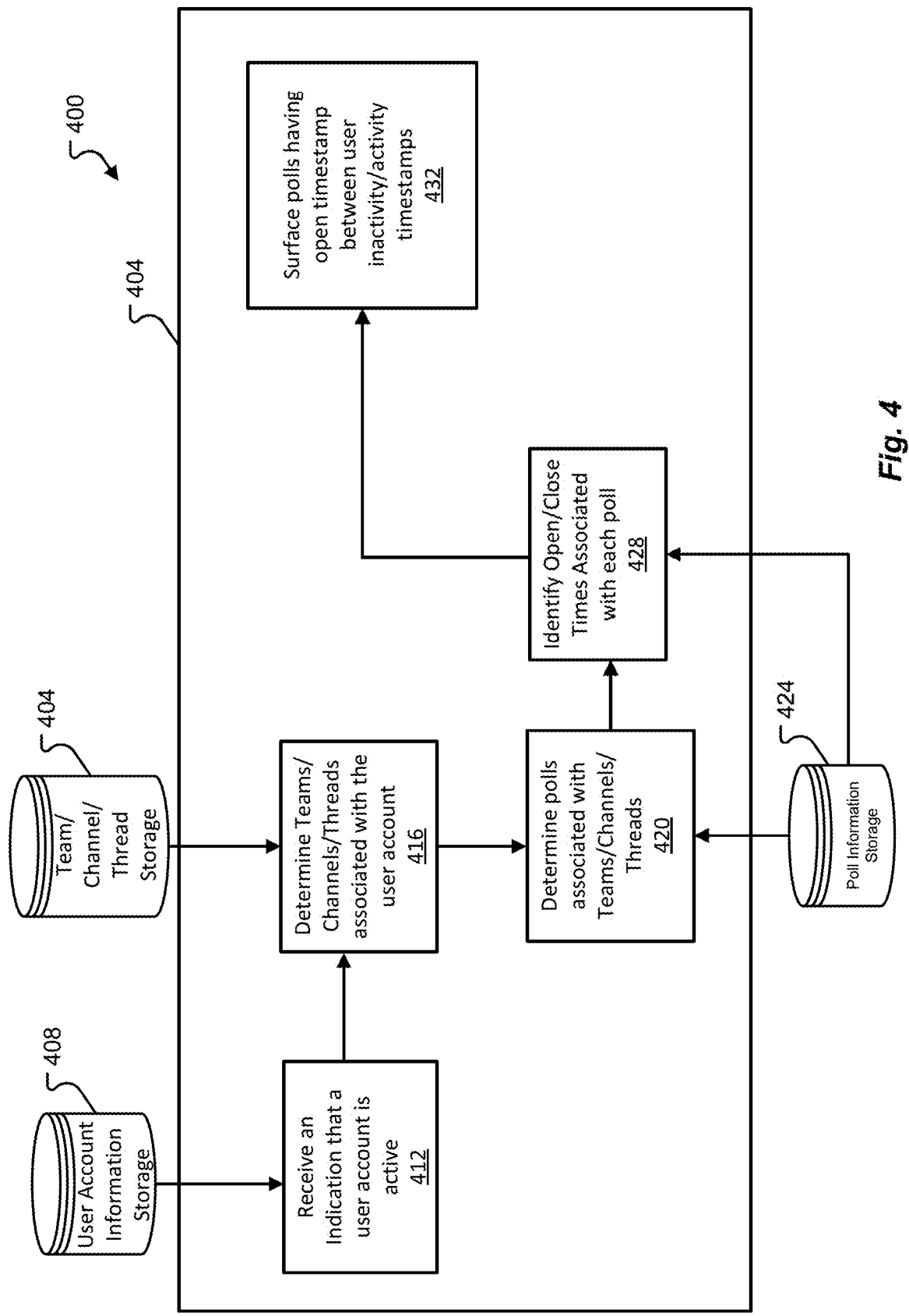
FIG. 4 depicts additional details of the communication, messaging, conferencing, and collaboration system in accordance with examples of the present disclosure.

FIG. 4 depicts additional details directed to identifying periods of user inactivity and surfacing polls assigned to the user during such periods utilizing a communication, messaging, conferencing, and collaboration system 400. A summary overview includes receiving information indicating that a user account is now active, determining one or more polls assigned to a team, channel, thread, or group associated with the user account during the period of inactivity, and surfacing those polls that remain open. The communication, messaging, conferencing, and collaboration system 400 may be the same as or similar to the communication, messaging, conferencing, and collaboration system 108 previously described. A notification 406 may be provided from the user account information storage 408 or a service associated with monitoring activity/inactivity of a user account, such as the activity monitor 330, to a poll monitor, such as the poll monitor 312. Upon receiving the notification at 412 that the user activity associated with a user account has switched to active—or that a period of user inactivity has ended, a component, such as the poll monitor 312, may determine at 416, one or more teams, channels, threads, groups etc. associated with a user account associated with the user; such information may be retrieved from a team/channel/thread/storage component 404. At 420, and based on the determined teams, channels, threads, etc. from the team/channel/ thread storage component 404, one or more polls associated with the teams/channels/threads may be determined. For example, poll information storage 424 may store all poll information including information indicating when a poll has been created and/or assigned to a team/channel/thread etc. In some instances, the poll information storage 424 may be the same as or similar to the poll storage 334. Accordingly, a collection of missed polls that were assigned to the user during a period of inactivity may be obtained at 420.

A further filtering step at 428 may be performed such that only those polls that are still open may be relevant to a user; accordingly, open and close polling times associated with each poll in the retrieved collection may act as a filter to remove those polls having a close time before a current time—that is, if a poll or period of time in which the poll was open has ended, the poll may not be surfaced or otherwise provided to the user. Of course, such filtering step may be optional. Based on the polls remaining, such polls may be surfaced to the user at 432.

Figure 5:
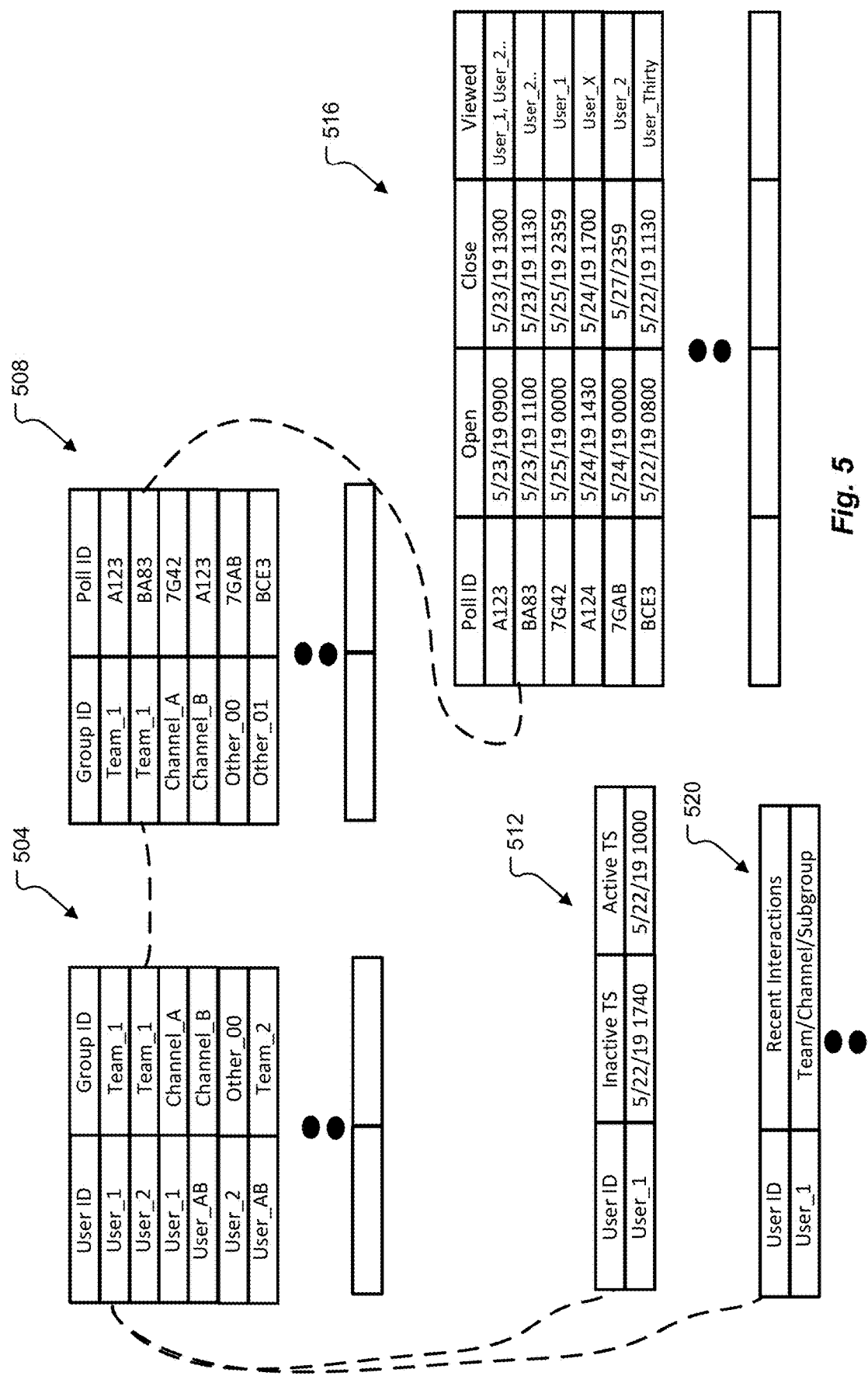
FIG. 5 depicts details of one or more data structures in accordance with examples of the present disclosure.

FIG. 5 depicts one or more data structures illustrating user and group poll assignments in accordance with examples of the present disclosure. A first data structure 504 may associate a user to one or more groups or organizational units, such as a channel, team, group, thread etc. As used herein, an organizational unit may refer to a group, channel, team, thread, and/or communication. An organizational unit may provide a manner of grouping objects, such as user accounts, and hierarchically managing permissions associated with one or more objects, such as a team, channel, or thread. Based on the group ID, one or more polls assigned to the group may be stored in a data structure 508 for example. Additional poll information, for example an open or start time, a close or end time, and one or more users who have viewed such information, may be stored in the data structure 516. The data structure 512 may store one or more time stamps associated with an active and non-active period of time associated with the user. In some instances, the data structure 512 may record or provided a timestamp every time a user account associated with a user is, or becomes, active or inactive; in other instances, just a most recent inactive and active time, such as inactive and active timestamps, are stored. The data structure 520 may store information indicating which areas of the communication, messaging, conferencing, and collaboration system 108 were recently visited or otherwise show recent user interaction. For example, the user may have been recently active in a specific channel or thread—such information may be stored at the data structure 520, where in some instances, only a last X number of interactions may be maintained.

Figure 6:
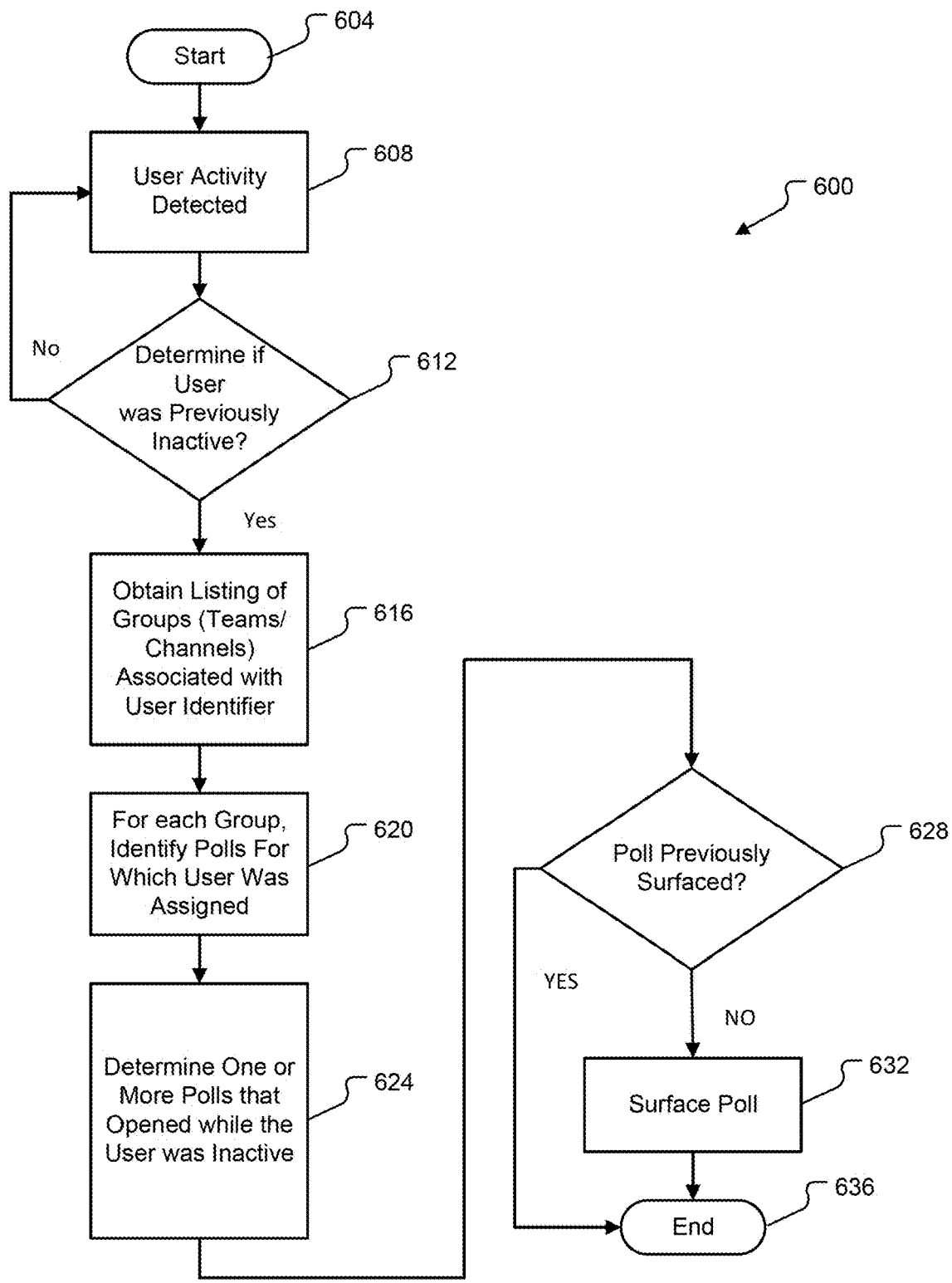
FIG. 6 depicts details of a method for identifying one or more missed polls and providing a notification to a user interface in accordance with examples of the present disclosure.

FIG. 6 depicts details of a method 600 for determining missed polls and then surfacing polling windows associated with the missed polls in accordance with examples of the present disclosure. A general order for the steps of the method 600 is shown in FIG. 6. Generally, the method 600 starts with a start operation 604 and ends with the end operation 640. The method 600 may include more or fewer steps or may arrange the order of the steps differently than those shown in FIG. 6. The method 600 can be executed as a set of computer-executable instructions executed by a computer system and encoded or stored on a computer readable medium. Further, the method 600 can be performed by gates or circuits associated with a processor, Application Specific Integrated Circuit (ASIC), a field programmable gate array (FPGA), a system on chip (SOC), or other hardware device. Hereinafter, the method 600 shall be explained with reference to the systems, components, modules, software, data structures, user interfaces, etc. described in conjunction with FIGS. 1-5.

The method 600 starts at 604 and proceeds to 608, where user account activity associated with a user may be detected—for example, such activity may be detected at an activity monitor 330. The method 600 may proceed to 612 where a determination as to whether or not the user account was previously inactive is performed. For example, a period of time between a detected user account activity and previously detected activity associated with a user account may be generated; if such period of time is greater than a threshold, then a determination may be made that the user was indeed inactive. By determining a time between the new user activity and the previously stored inactive timestamp for example, short periods of inactivity, such as were a user may be reading text at a display, but not interacting with an application displaying the text, may be filtered from or otherwise not subjected to the remaining portions of the method 600.

At 616, a list of groups, such as teams, channels, threads, etc. for the user may be obtained such that any polls assigned to a group that the user is a member of may be determined at 620. At 624, the polls identified at 620 may be filtered such that only the open polls (that is, the polls currently accepting user input) may be presented to the user. While only open polls may be surfaced, the user may have the ability to view polls that are closed utilizing the closed polls tab in the graphical user interface of 200L for example. In some instances, a poll may have already been surfaced to the user where such determination may be made at 628 based on a view history in the data structure 516 for example; accordingly, where the poll was previously surface, in some instances, such polls may not be resurfaced again. Otherwise, the poll(s), or the poll windows, may be surfaced at 632 and the method may end at 636.

In some instances, the inactivity time stamp may be associated with a user using a first device while an activity time stamp may be associated with the user using a second different device. Accordingly, the ability to surface polls that a user may have missed may be device independent.

Figure 7:
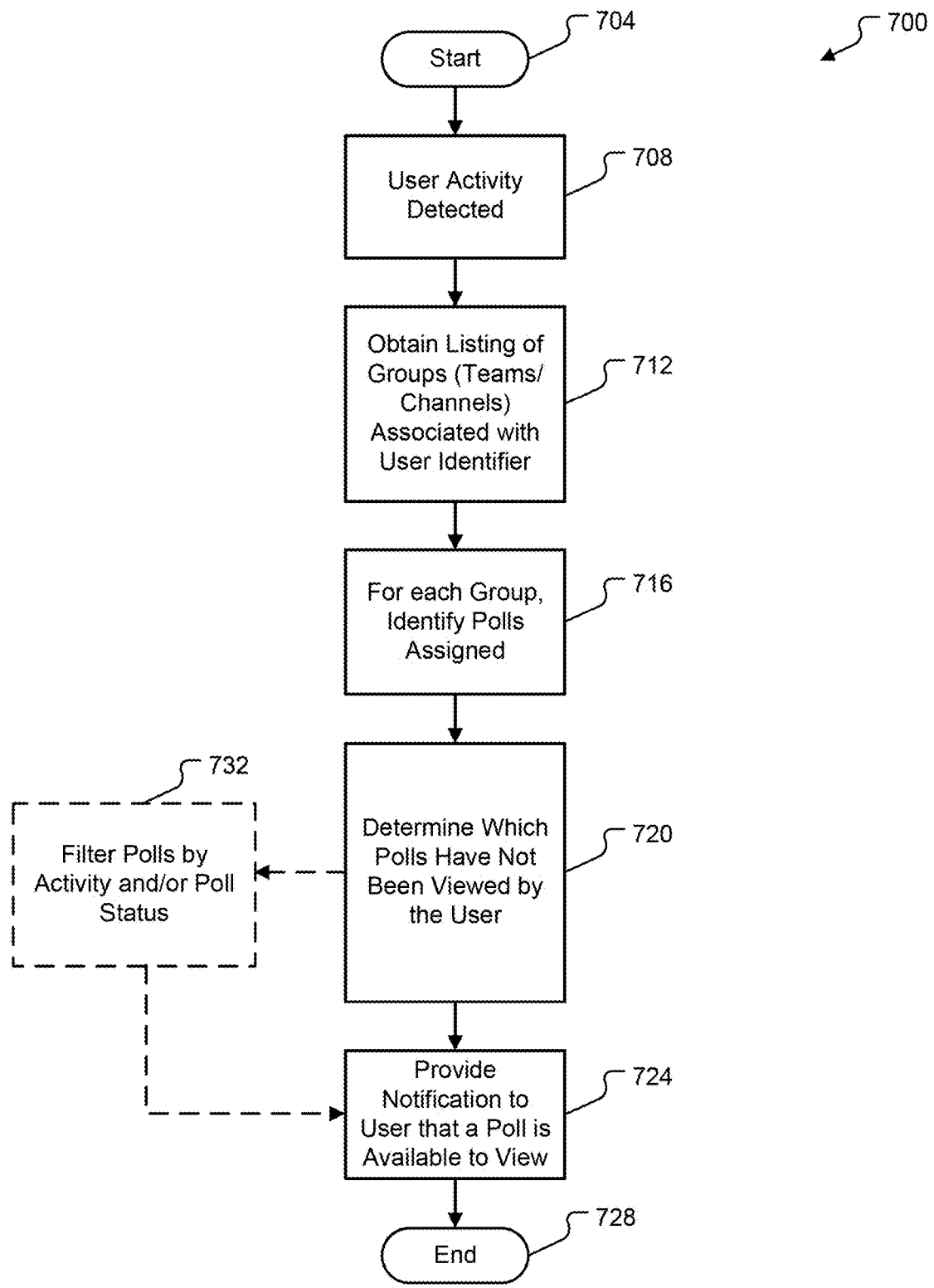
FIG. 7 depicts details of a method for identifying one or more missed polls, filtering the missed polls, and then providing a notification to a user interface in accordance with examples of the present disclosure.

FIG. 7 depict details of a method 700 for determining missed polls and then surfacing polling windows associated with the missed polls in accordance with examples of the present disclosure. A general order for the steps of the method 700 is shown in FIG. 7. Generally, the method 700 starts with a start operation 704 and ends with the end operation 728. The method 700 may include more or fewer steps or may arrange the order of the steps differently than those shown in FIG. 7. The method 700 can be executed as a set of computer-executable instructions executed by a computer system and encoded or stored on a computer readable medium. Further, the method 700 can be performed by gates or circuits associated with a processor, Application Specific Integrated Circuit (ASIC), a field programmable gate array (FPGA), a system on chip (SOC), or other hardware device. Hereinafter, the method 700 shall be explained with reference to the systems, components, modules, software, data structures, user interfaces, etc. described in conjunction with FIGS. 1-6.

The method 700 starts at 704 and proceeds to 708, where user account activity associated with a user may be detected—for example, such activity may be detected at an activity monitor 330. In some instances, the detected user activity may correspond to a log in event to a user account or an activation of one or more areas or portions associated with the one or more icons 212-222. In some instances, the detected activity may correspond to a user interacting with one or more features of a graphical user interface, such as a graphical user interface 200A-L. In some instances, a period of inactivity may correspond to an amount of time that passes without user interaction at the graphical user interface—for example, if a user does not interact with a graphical user interface for x amount of time, the user may be considered to be inactive. The method 700 may proceed to 712, where a list of groups, such as teams, channels, threads, etc. for the user or otherwise associated with the user account may be obtained such that any polls assigned to a group that the user account is a member of or created for a group that the user account is a member of, may be determined at 716. That is, one or more polls assigned to one or more groups that the user account is associated with may be determined at 716. In some instances, all polls assigned to the group in which a user account is associated may be determined. In some instances, only those polls assigned during periods where the user account is inactive may be determined.

At 720, the polls not viewed by the user may be determined. For example, to determine whether or not a user has viewed a poll, data in the data structure 516 may be consulted. In some instances, a poll may be updated with additional information and/or to include poll results; accordingly, a poll not having been viewed by the user may correspond to a latest instance of the poll not having been viewed by the user. To determine whether a poll has been viewed by a user, user account activity with respect to the poll, poll window, and/or poll results may be tracked, where the account activity may be based on a timestamp indicating when such interaction occurred. At 724, the polls not viewed by the user may be surfaced to the user. In some instances, a notification may be provided to a user indicating that one or more polls, or poll windows, are available for viewing.

Alternatively, or in addition, the polls may be filtered at 732 such that a listing of polls that meet the filter criteria may be provided to 720. That is, a list of polls not viewed by the user may be provided to the filtering step 732. One or more filters, which may or may not be configured by a user, may be applied to the list of non-viewed polls. For example, a first filter may be applied to the list of polls and may limit the polls to only those polls that were assigned or created during a period of inactivity associated with the user account. A second filter may be applied to the list of polls and may limit the polls to only those polls for groups, channels, threads, etc. that the user was most recently active in. A third filter may be applied to the list of polls and may limit the polls to only those polls that were updated with results. As another example, a fourth filter may be applied to the list of polls and may limit the polls to only those polls that are currently open or live. As can be appreciated, filters may be combined in varying combinations in order to acquire data across environments and groups. The filtered listing of polls may then be provided to step 724 such that a notification and/or the poll window itself may be surfaced to the user. The method 700 may then end at 728.

While different aspects of a poll window, such as a poll window 262, 268, 270, 272, 278, 284A-284D, 269, and/or 286 have been described, it should be understood that the existence of the poll window may take one or more forms. For example, a poll window may be displayed as a separate window or as a window that exists in or is otherwise part of a parent window. For example, the poll window may appear in a same stack as the parent window and/or the same stack as another window; accordingly, the poll window may be in a stack position that is in front of or behind another window, such as a parent window. As another example, the poll window may pop out as another separate window. In accordance with some examples, the poll window may transition from a window in a same stack as a parent window to a separate window and/or from a separate window to a window in a same stack as a parent window.

Figure 8:
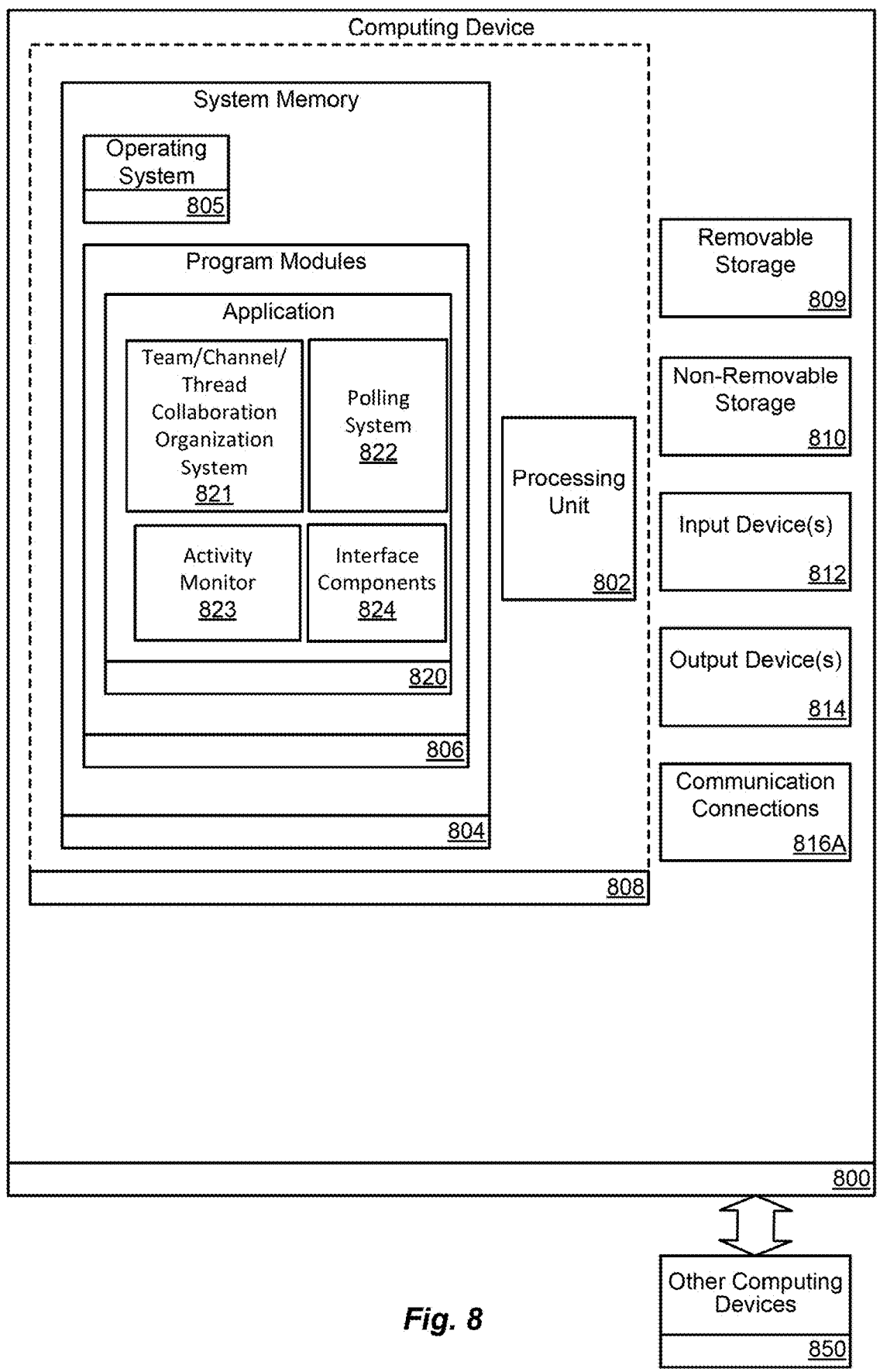
FIG. 8 is a block diagram illustrating example physical components of a computing device with which aspects of the disclosure may be practiced.

FIG. 8 is a block diagram illustrating physical components (e.g., hardware) of a computing device 800 with which aspects of the disclosure may be practiced. The computing device components described below may be suitable for the computing devices, such as the client device 116, and/or the communication, messaging, conferencing, and collaboration system 108, as described above. In a basic configuration, the computing device 800 may include at least one processing unit 802 and a system memory 804. Depending on the configuration and type of computing device, the system memory 804 may comprise, but is not limited to, volatile storage (e.g., random access memory), non-volatile storage (e.g., read-only memory), flash memory, or any combination of such memories. The system memory 804 may include an operating system 805 and one or more program modules 806 suitable for performing the various aspects disclosed herein such as the polling system 822, interface components 824, calendar 823, and/or the grouping organizational system 821. The operating system 805, for example, may be suitable for controlling the operation of the computing device 800. Furthermore, aspects of the disclosure may be practiced in conjunction with a graphics library, other operating systems, or any other application program and is not limited to any particular application or system. This basic configuration is illustrated in FIG. 8 by those components within a dashed line 808. The computing device 800 may have additional features or functionality. For example, the computing device 800 may also include additional data storage devices (removable and/or non-removable) such as, for example, magnetic disks, optical disks, or tape. Such additional storage is illustrated in FIG. 8 by a removable storage device 809 and a non-removable storage device 910.

As stated above, a number of program modules and data files may be stored in the system memory 804. While executing on the at least one processing unit 802, the program modules 806 (e.g., one or more applications 820) may perform processes including, but not limited to, the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 8 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 800 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 800 may also have one or more input device(s) 812 such as a keyboard, a mouse, a pen, a sound or voice input device, a touch or swipe input device, etc. The output device(s) 814 such as a display, speakers, a printer, etc. may also be included. The aforementioned devices are examples and others may be used. The computing device 800 may include one or more communication connections 816A allowing communications with other computing devices 850. Examples of suitable communication connections 816A include, but are not limited to, radio frequency (RF) transmitter, receiver, and/or transceiver circuitry; universal serial bus (USB), parallel, network interface card, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. Any such computer storage media may be part of the computing device 800. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 9A:
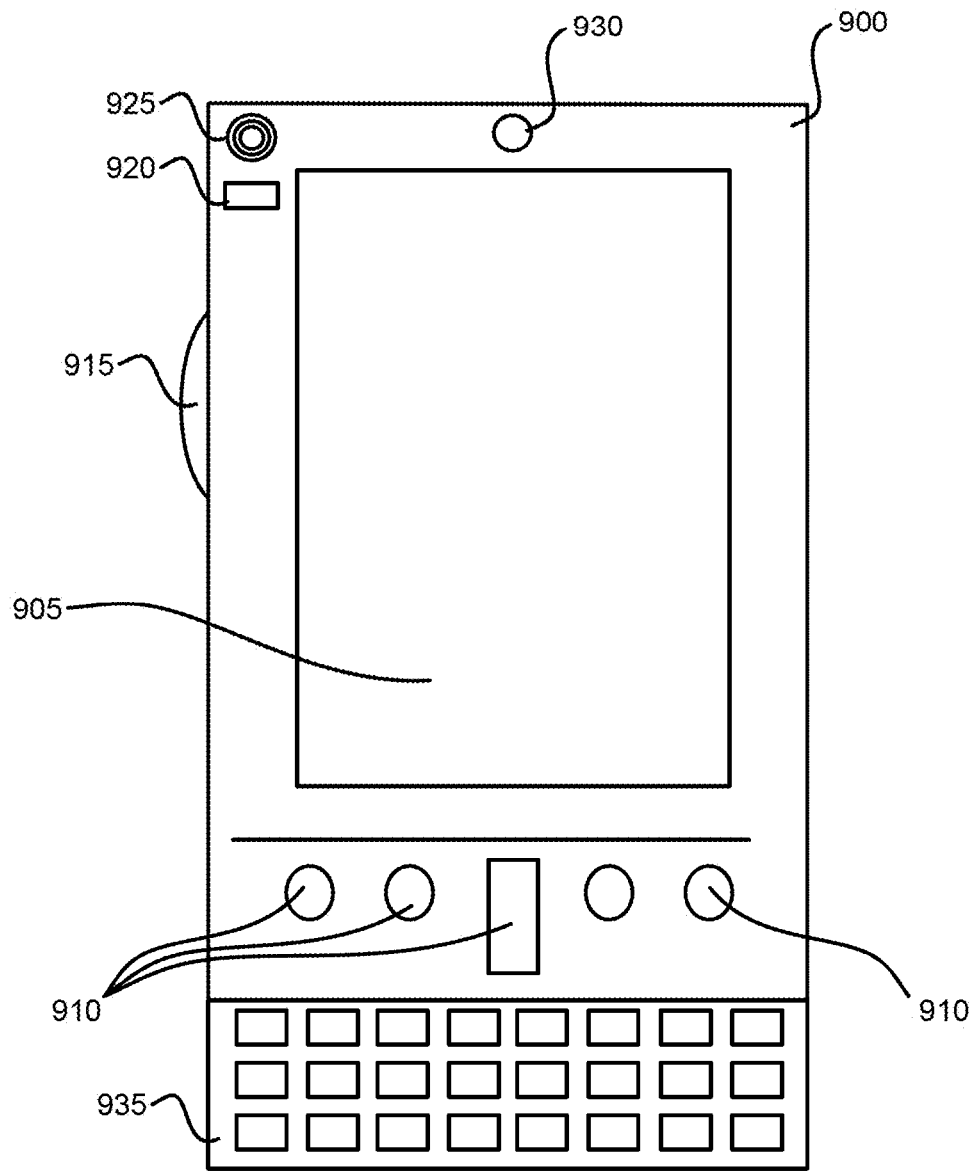
FIG. 9A is a simplified block diagram of a computing device with which aspects of the present disclosure may be practiced.
Figure 9B:
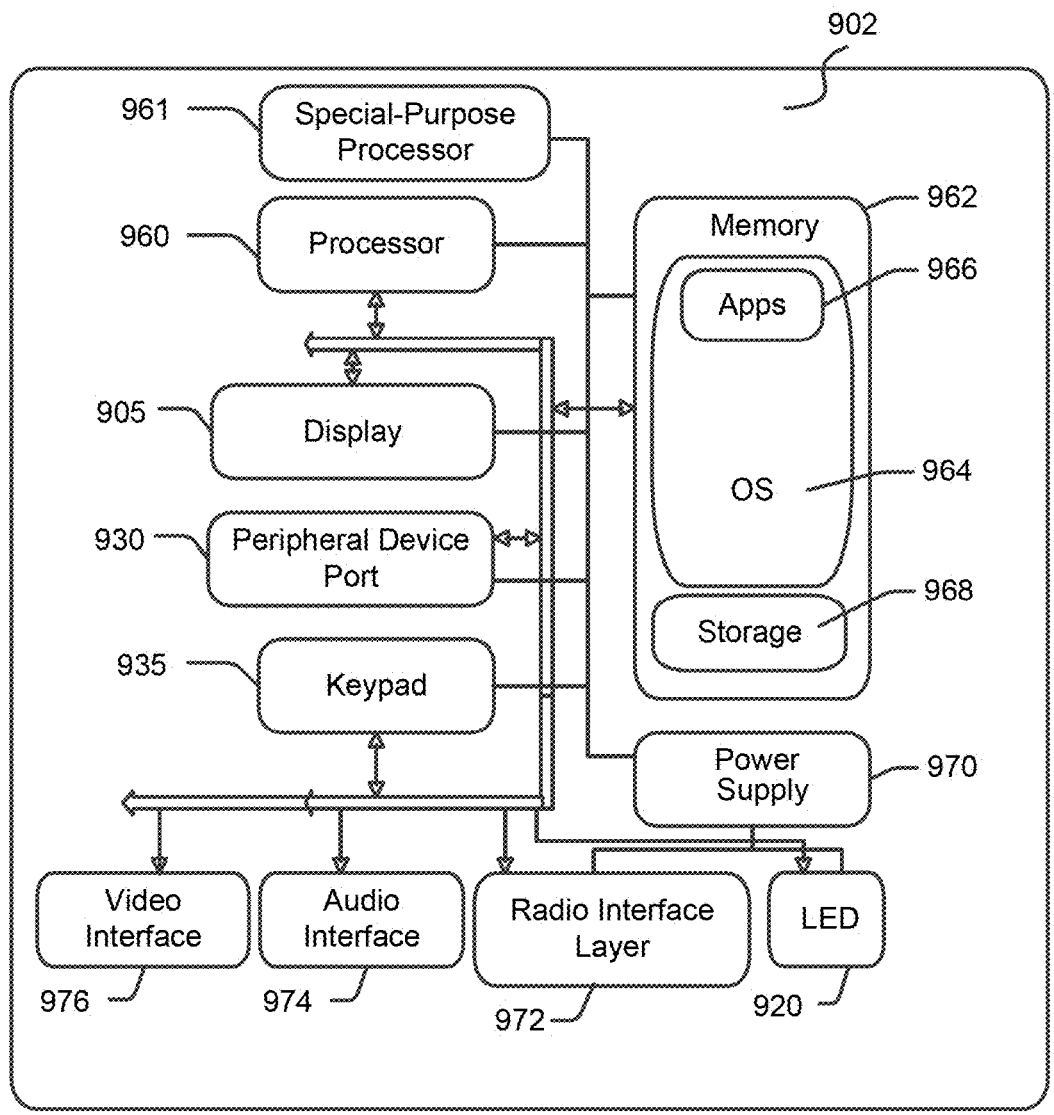
FIG. 9B is another are simplified block diagram of a mobile computing device with which aspects of the present disclosure may be practiced.

FIGS. 9A and 9B illustrate a computing device, client device, or mobile computing device 900, for example, a mobile telephone, a smart phone, wearable computer (such as a smart watch), a tablet computer, a laptop computer, and the like, with which aspects of the disclosure may be practiced. In some aspects, the client device (e.g., 116A-116C) may be a mobile computing device. With reference to FIG. 9A, one aspect of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. The display 905 of the mobile computing device 900 may also function as an input device (e.g., a touch screen display). If included, an optional side input element 915 allows further user input. The side input element 915 may be a rotary switch, a button, or any other type of manual input element. In alternative aspects, mobile computing device 900 may incorporate more or less input elements. For example, the display 905 may not be a touch screen in some aspects. In yet another alternative aspect, the mobile computing device 900 is a portable phone system, such as a cellular phone. The mobile computing device 900 may also include an optional keypad 935. Optional keypad 935 may be a physical keypad or a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some aspects, the mobile computing device 900 incorporates a vibration transducer for providing the user with tactile feedback. In yet another aspect, the mobile computing device 900 incorporates input and/or output ports, such as an audio input (e.g., a microphone jack), an audio output (e.g., a headphone jack), and a video output (e.g., a HDMI port) for sending signals to or receiving signals from an external source.

FIG. 9B is a block diagram illustrating the architecture of one aspect of computing device, a server, or a mobile computing device. That is, the computing device 900 can incorporate a system (e.g., an architecture) 902 to implement some aspects. The system 902 can implemented as a "smart phone" capable of running one or more applications (e.g., browser, e-mail, calendaring, contact managers, messaging clients, games, and media clients/players). In some aspects, the system 902 is integrated as a computing device, such as an integrated personal digital assistant (PDA) and wireless phone.

One or more application programs 966 may be loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. The system 902 also includes a non-volatile storage area 968 within the memory 962. The non-volatile storage area 968 may be used to store persistent information that should not be lost if the system 902 is powered down. The application programs 966 may use and store information in the non-volatile storage area 968, such as e-mail or other messages used by an e-mail application, title content, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900 described herein (e.g., search engine, extractor module, relevancy ranking module, answer scoring module, etc.).

The system 902 has a power supply 970, which may be implemented as one or more batteries. The power supply 970 might further include an external power source, such as an AC adapter or a powered docking cradle that supplements or recharges the batteries.

The system 902 may also include a radio interface layer 972 that performs the function of transmitting and receiving radio frequency communications. The radio interface layer 972 facilitates wireless connectivity between the system 902 and the "outside world," via a communications carrier or service provider. Transmissions to and from the radio interface layer 972 are conducted under control of the operating system 964. In other words, communications received by the radio interface layer 972 may be disseminated to the application programs 966 via the operating system 964, and vice versa.

The visual indicator 920 may be used to provide visual notifications, and/or an audio interface 974 may be used for producing audible notifications via the audio transducer 925. In the illustrated configuration, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. In accordance with aspects of the present disclosure, the microphone may also serve as an audio sensor to facilitate control of notifications, as will be described below. The system 902 may further include a video interface 976 that enables an operation of an on-board camera 930 to record still images, video stream, and the like.

A mobile computing device 900 implementing the system 902 may have additional features or functionality. For example, the mobile computing device 900 may also include additional data storage devices (removable and/or non-removable) such as, magnetic disks, optical disks, or tape. Such additional storage is illustrated in FIG. 9B by the non-volatile storage area 968.

Data/information generated or captured by the mobile computing device 900 and stored via the system 902 may be stored locally on the mobile computing device 900, as described above, or the data may be stored on any number of storage media that may be accessed by the device via the radio interface layer 972 or via a wired connection between the mobile computing device 900 and a separate computing device associated with the mobile computing device 900, for example, a server computer in a distributed computing network, such as the Internet. As should be appreciated such data/information may be accessed via the mobile computing device 900 via the radio interface layer 972 or via a distributed computing network. Similarly, such data/information may be readily transferred between computing devices for storage and use according to well-known data/information transfer and storage means, including electronic mail and collaborative data/information sharing systems.

Figure 10:
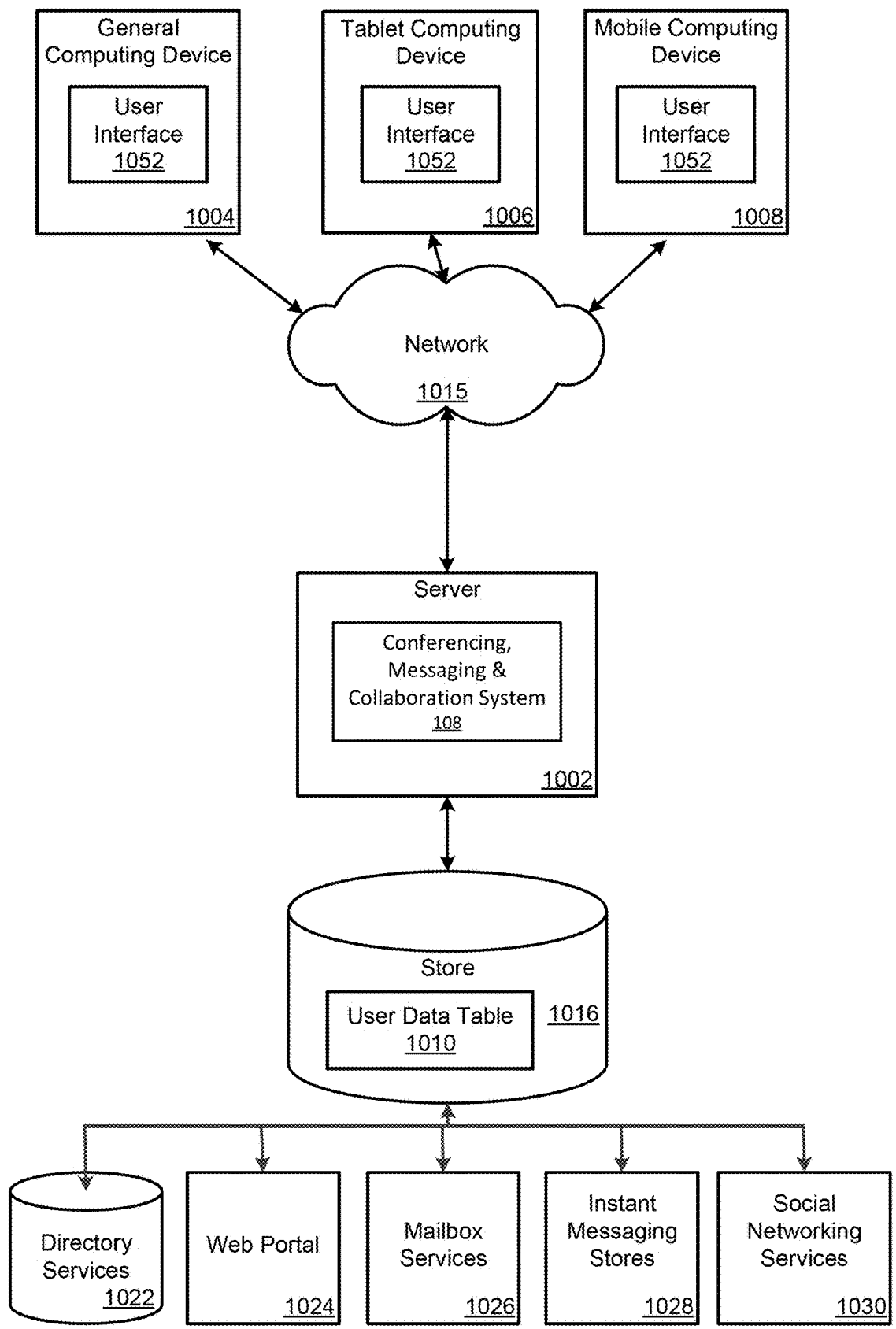
FIG. 10 is a simplified block diagram of a distributed computing system in which aspects of the present disclosure may be practiced.

FIG. 10 illustrates one aspect of the architecture of a system for processing data received at a communication, messaging, conferencing, and collaboration system 1003 from a remote source, as described above. Content at a server device 1002 may be stored in different communication channels or other storage types. For example, various images, or files may be stored using a directory service 1022, a web portal 1024, a mailbox service 1026, an instant messaging store 1028, or a social networking site 1030. A unified profile API based on the user data table 1010 may be employed by a client that communicates with server device 1002. The server device 1002 may provide data to and from a client computing device such as the client devices 1004-1008 through a network 1015. By way of example, the client device 1006 described above may be embodied in a personal computer 1004, a tablet computing device 1006, and/or a mobile computing device 1008 (e.g., a smart phone).

The above specification, examples and data provide a complete description of the manufacture and use of the composition of the invention. Since many aspects of the invention can be made without departing from the spirit and scope of the invention, the invention resides in the claims hereinafter appended.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The exemplary systems and methods of this disclosure have been described in relation to computing devices. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary aspects illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Any of the steps, functions, and operations discussed herein can be performed continuously and automatically.

While the flowcharts have been discussed and illustrated in relation to a particular sequence of events, it should be appreciated that changes, additions, and omissions to this sequence can occur without materially affecting the operation of the disclosed configurations and aspects.

A number of variations and modifications of the disclosure can be used. It would be possible to provide for some features of the disclosure without providing others.

In yet another configurations, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another configuration, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another configuration, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions that may be implemented with particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various configurations and aspects, includes components, methods, processes, systems and/or apparatus substantially as depicted and described herein, including various combinations, sub combinations, and subsets thereof. Those of skill in the art will understand how to make and use the systems and methods disclosed herein after understanding the present disclosure. The present disclosure, in various configurations and aspects, includes providing devices and processes in the absence of items not depicted and/or described herein or in various configurations or aspects hereof, including in the absence of such items as may have been used in previous devices or processes, e.g., for improving performance, achieving ease, and/or reducing cost of implementation.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an configuration with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

In accordance with at least one example of the present disclosure, a system for displaying a window associated with a poll is provided. The system may include a processor and memory including instructions which when executed by the processor, causes the processor to: receive an indication that a user account has transitioned from an inactive state to an active state, determine that the user account is associated with an organizational unit, identify a poll that was associated with the organizational unit while the user account was in the inactive state, and cause a notification to be displayed at a user interface of a computing device, the notification including a graphical user interface configured to receive input, for the identified poll, from a user associated with the user account.

At least one aspect of the above example includes where the graphical user interface and the organizational unit are associated with a first application of the user interface, and the graphical user interface is displayed at a second application different from the first application of the user interface until input from the user associated with the user account is received. At least one aspect of the above example includes instructions, which when executed by the processor, causes the processor to cause the graphical user interface to persist at the user interface of the computing device. At least one aspect of the above example includes instructions, which when executed by the processor, causes the processor to cause the notification to be displayed at a graphical user interface different from a graphical user interface associated with the organizational unit. At least one aspect of the above example includes where the inactive state corresponds to a period of time between a last active state for the user account and a most recent active state for the user account. At least one aspect of the above example includes instructions, which when executed by the processor, causes the processor to determine that the user account has interacted with one or more organizational units, communications, and/or documents during the last active state, and identify a second poll as being associated with the one or more organizational units, communications, and/or documents. At least one aspect of the above example includes where the notification indicates that a new poll was created and assigned to the organizational unit of which the user account is a member. At least one aspect of the above example includes where the notification that the user account has transitioned from the inactive state to the active state corresponds to a user logging into the user account.

In accordance with at least one example of the present disclosure, a method for displaying one or more graphical user interfaces associated with one or more polls is provided. The method may include determining a period of inactivity associated with a user account, determining an organizational unit associated with the user account, identifying one or more polls that were created during the period of inactivity, the one or more polls being associated with one or more organizational units, and causing a notification to be displayed at a user interface of a computing device when the user account and the one or more polls are associated with at least one common organizational unit, the notification indicating that the identified one or more polls were created during the period of inactivity.

At least one aspect of the above example includes causing the notification to be displayed at a graphical user interface different from a graphical user interface associated with the at least one common organizational unit. At least one aspect of the above example includes where the at least one common organizational unit includes at least one of a group, channel, or thread. At least one aspect of the above example includes retrieving user account activity associated with the at least one common organizational unit, causing the notification to be displayed at the user interface of the computing device when the user account activity occurred within a first period of time. At least one aspect of the above example includes where the notification includes a graphical user interface configured to receive input, for the one or more identified polls, from a user associated with the user account. At least one aspect of the above example includes causing the graphical user interface to persist at the user interface of the computing device. At least one aspect of the above example includes where the period of inactivity associated with the user account corresponds to a period of time between a last active state for the user account and a most recent active state for the user account. At least one aspect of the above example includes where the most recent active state for the user account corresponds to a log in event by the user account.

In accordance with at least one example of the present disclosure, a method for surfacing one or more graphical user interfaces associated with one or more polls is provided. The method may include determining an organizational unit associated with a user account, determining a plurality of polls associated with the organizational unit, identifying one or more polls of the plurality polls based on a period of inactivity associated with the user account, wherein the one or more polls were at least one of created for an organizational unit or assigned to the organizational unit during the period of inactivity, and causing a graphical user interface for one or more polls of the plurality of polls to surface at a user interface of a computing device, wherein the graphical user interface is configured to receive input for the poll of the one or more polls from the user associated with the user account.

At least one aspect of the above example includes where the graphical user interface and the organizational unit are associated with a first application of a user interface, and the graphical user interface is configured to surface at a second application different from the first application of the user interface until input from a user associated with the user account is received. At least one aspect of the above example includes where the period of inactivity corresponds to a logging off event and a logging in event associated with the user account. At least one aspect of the above example includes where the period of inactivity corresponds to a lack of interaction at the user interface of the computing device for a specified period of time.

What is claimed is:

1. A system for displaying a poll notification, the system comprising:
   a processor; and
   memory including instructions which when executed by the processor, causes the processor to control the system to perform:
      detecting that a user account has transitioned from an inactive state to an active state;
      in response to detecting that the user account has transitioned to the active state, performing:
         identifying an organizational unit associated with the user account; and
         identifying a poll that has become associated with the identified organizational unit while the user account was in the inactive state; and
      causing a notification to be displayed at a user interface of a computing device, the notification configured to present content of the identified poll and receive an input, for the identified poll, from a user associated with the user account.

2. The system of claim 1, wherein:
   the notification includes a graphical user interface, and the graphical user interface and organizational unit are associated with a first application of the user interface, and
   the graphical user interface is displayed at a second application different from the first application of the user interface until the input from the user associated with the user account is received.

3. The system of claim 2, wherein the instructions, when executed by the processor, further causes the processor to control the system to perform causing the graphical user interface to persist at the user interface of the computing device.

4. The system of claim 1, wherein the instructions, when executed by the processor, further causes the processor to control the system to perform causing the notification to be displayed at a graphical user interface different from a graphical user interface associated with the organizational unit.

5. The system of claim 1, wherein the inactive state corresponds to a period of time between a last active state for the user account and a most recent active state for the user account.

6. The system of claim 5, wherein the instructions, when executed by the processor, further causes the processor to control the system to perform:
   determining that the user account has interacted with one or more organizational units, communications, and/or documents during the last active state; and
   identifying a second poll as being associated with the one or more organizational units, communications, and/or documents.

7. The system of claim 1, wherein the notification indicates that a new poll was created and assigned to the organizational unit of which the user account is a member.

8. The system of claim 1, wherein the notification that the user account has transitioned from the inactive state to the active state corresponds to a user logging into the user account.

9. A method of displaying a poll notification, the method comprising:
   detecting that a user account has transitioned from an inactive state to an active state;
   in response to detecting that the user account has transitioned to the active state, performing:
      identifying an organizational unit associated with the user account; and
      identifying a poll that has become associated with the identified organizational unit while the user account was in the inactive state; and
   causing a notification to be displayed at a user interface of a computing device, the notification configured to present content of the identified poll and receive an input, for the identified poll, from a user associated with the user account.

10. The method of claim 9, wherein:
    the notification includes a graphical user interface, and the graphical user interface and organizational unit are associated with a first application of the user interface, and
    the graphical user interface is displayed at a second application different from the first application of the user interface until the input from the user associated with the user account is received.

11. The method of claim 10, further comprising causing the graphical user interface to persist at the user interface of the computing device.

12. The method of claim 9, further comprising causing the notification to be displayed at a graphical user interface different from a graphical user interface associated with the organizational unit.

13. The method of claim 9, wherein the inactive state corresponds to a period of time between a last active state for the user account and a most recent active state for the user account.

14. The method of claim 13, further comprising:
    determining that the user account has interacted with one or more organizational units, communications, and/or documents during the last active state; and
    identifying a second poll as being associated with the one or more organizational units, communications, and/or documents.

15. The method of claim 9, wherein the notification indicates that a new poll was created and assigned to the organizational unit of which the user account is a member.

16. The method of claim 9, wherein the notification that the user account has transitioned from the inactive state to the active state corresponds to a user logging into the user account.

17. A non-transitory computer-readable medium comprising instructions that, when executed by a processor, cause the processor to control a system to perform:
    detecting that a user account has transitioned from an inactive state to an active state;
    in response to detecting that the user account has transitioned to the active state, performing:
       identifying an organizational unit associated with the user account; and
       identifying a poll that has become associated with the identified organizational unit while the user account was in the inactive state; and
    causing a notification to be displayed at a user interface of a computing device, the notification configured to present content of the identified poll and receive an input, for the identified poll, from a user associated with the user account.

18. The non-transitory computer-readable medium of claim 17, wherein:
    the notification includes a graphical user interface, and the graphical user interface and organizational unit are associated with a first application of the user interface, and
    the graphical user interface is displayed at a second application different from the first application of the user interface until the input from the user associated with the user account is received.

19. The non-transitory computer-readable medium of claim 18, wherein the instructions, when executed by the processor, further cause the processor to control the system to perform causing the graphical user interface to persist at the user interface of the computing device.

20. The non-transitory computer-readable medium of claim 18, wherein the instructions, when executed by the processor, further cause the processor to control the system to perform causing the notification to be displayed at a graphical user interface different from a graphical user interface associated with the organizational unit.

* * * * *